(12) United States Patent
Kamijima et al.

(10) Patent No.: US 7,768,707 B2
(45) Date of Patent: Aug. 3, 2010

(54) CONVERGING SUBSTRATE, ELECTRO-OPTIC DEVICE, SUBSTRATE FOR ELECTRO-OPTIC DEVICE, PROJECTOR, AND ELECTRONIC APPARATUS

(75) Inventors: Shunji Kamijima, Hara-Mura (JP); Kazuhisa Mizusako, Chino (JP); Makoto Inoguchi, Nishirokyo (JP)

(73) Assignee: Seiko Epson Corporation, Tokyo (JP)

( * ) Notice: Subject to any disclaimer, the term of this patent is extended or adjusted under 35 U.S.C. 154(b) by 519 days.

(21) Appl. No.: 11/670,483

(22) Filed: Feb. 2, 2007

(65) Prior Publication Data

US 2007/0183016 A1  Aug. 9, 2007

(30) Foreign Application Priority Data

Feb. 6, 2006  (JP)  ............................. 2006-028291
Feb. 6, 2006  (JP)  ............................. 2006-028292

(51) Int. Cl.
 *G02B 27/10*  (2006.01)
(52) U.S. Cl. ........................................ 359/625; 359/627
(58) Field of Classification Search ................. 359/625, 359/247
See application file for complete search history.

(56) References Cited

U.S. PATENT DOCUMENTS

| | | | | |
|---|---|---|---|---|
| 6,144,496 A * | 11/2000 | Goto | ........................ | 359/619 |
| 7,453,639 B2 | 11/2008 | Katsura | | |
| 7,474,463 B2 | 1/2009 | Katsura et al. | | |
| 2006/0215082 A1 * | 9/2006 | Nakano | ....................... | 349/113 |
| 2007/0182874 A1 * | 8/2007 | Kamijima | .................... | 349/44 |
| 2008/0212177 A1 | 9/2008 | Katsura et al. | | |
| 2008/0212178 A1 | 9/2008 | Katsura et al. | | |
| 2009/0040605 A1 | 2/2009 | Katsura et al. | | |

FOREIGN PATENT DOCUMENTS

| | | |
|---|---|---|
| CN | 1700955 A | 11/2005 |
| JP | A 03-170911 | 7/1991 |
| JP | A 2000-330101 | 11/2000 |
| JP | A 2004-070282 | 3/2004 |
| JP | A-2004-347692 | 12/2004 |
| WO | WO 2004/097511 | * 11/2004 |

OTHER PUBLICATIONS

Takayuki Fukasawa et al., "Deep Dry Etching of Quartz Plate Over 100μm In Depth Employing Ultra-Thick Photoresist (SU-8)," Jpn. J. Appl. Phys. vol. 42, No. 6A, pp. 3702-3706, Jun. 2003.

* cited by examiner

*Primary Examiner*—Jordan M. Schwartz
*Assistant Examiner*—James C Jones
(74) *Attorney, Agent, or Firm*—Oliff & Berridge, PLC

(57) ABSTRACT

An electro-optic device having a plurality of pixels arranged in a matrix pattern, including: a converging substrate formed of a transparent substrate having groove-shaped prism elements formed in an array pattern, wherein the prism elements are arranged along boundary areas of the pixels, wherein the prism elements each include a plurality of beveled portions arranged on side walls thereof in the direction of the thickness of the converging substrate, and wherein the inclination angle of the beveled portions arranged on an opening end side of each of the prism elements with respect to the normal line of the converging substrate on which the prism elements are formed is smaller than the inclination angle of the other beveled portions.

12 Claims, 18 Drawing Sheets

CONVERGING SUBSTRATE, ELECTRO-OPTIC DEVICE, SUBSTRATE FOR ELECTRO-OPTIC DEVICE, PROJECTOR, AND ELECTRONIC APPARATUS

BACKGROUND

1. Technical Field

Several aspects of the present invention relate to a converging substrate, an electro-optic device, a substrate for an electro-optic device, a projector, and an electronic apparatus.

2. Related Art

An electro-optic device includes circuits for driving pixels in an image display area and, in particular, a liquid crystal device includes various wirings and switching devices such as TFT (Thin Film Transistor) Therefore, the ratio (aperture ratio) of an area from which. light rays actually go out (an area which contributes to a display) with respect to a pixel area is, for example, approximately 70%, and hence only the light amount corresponding to this aperture ratio is used for the display. Therefore, improvement of the efficiency for light utilization by providing microlenses corresponding to the respective pixels of the liquid crystal device and converging light rays supplied from a light source toward aperture areas of the pixels is proposed (for example, see Japanese Unexamined Patent Application Publication No. 2004-70282).

Through the usage of the liquid crystal device having a microlens array in a projector, light rays can be converged to the aperture areas of the pixels, so that the efficiency for light utilization in the liquid crystal device as a Slight modulation device may be improved. However, there is a problem that ray angles of light rays entering a liquid crystal layer are increased because incident light rays are refracted by the microlens and hence the contrast is lowered. There is another problem that the efficiency for light utilization in a projection optical system is lowered since the light rays having a ray angle exceeding the numerical aperture (NA) of the projection optical system is not used for display. In addition, since the convergence is performed by a lens, concentration of the light rays occurs as a result of convergence, so that generation of luminance distribution in a pixel as well as deterioration of light resistance due to the convergence may be resulted.

SUMMARY

An advantage of some aspects of the invention is an electro-optic device that achieves high-contrast display and high efficiency for light utilization. Another advantage of the invention is a substrate for an electro-optic device which achieves high-contrast display and is suitable for manufacturing the electro-optic device which achieves high efficiency for light utilization. Still another advantage of the invention is a projector which achieves projected display with high-luminance and high-contrast, and prevents generation of luminance distribution in a pixel due to concentration of light rays and deterioration of light resistance due to light convergence.

An electro-optic device according to an aspect of the invention is an electro-optic device having a plurality of pixels arranged in a matrix pattern, including a converging substrate formed of a transparent substrate having groove-shaped prism elements formed in an array pattern, wherein the prism elements are arranged along boundary areas of the pixels, the prism elements each include a plurality of beveled portions arranged on side walls thereof in the direction of the thickness of the converging substrate, and the prism elements each include beveled portions whose inclination angle with respect to the direction of the normal line of the converging substrate is smaller than that of other beveled portions on an opening end side of each of the prism elements.

With the provision of the converging substrate having a configuration in which the plurality of beveled portions having different inclination angles are arranged on the side walls of each of the prism elements and the beveled portions having a small inclination angle are formed on the opening end side of the prism element, the beveled portions which extend in the direction close to the direction parallel with the normal line are provided on the opening end side while tapering toward the distal end of the prism element. With the provision of the beveled portions having a small inclination angle, the incident angle of light rays being reflected by the beveled portions and entering the pixels is prevented from increasing excessively, and hence a display contrast is increased. Through decrease of the angle of the beveled portions on the opening end side with respect to the normal line, the reflected light rays from the beveled portions proceed toward portions in the vicinity of the boundaries of the pixels. Therefore, the distribution of light rays entering the pixel is uniformized, so that deterioration of the electro-optic device due to the irradiation of the light rays may be prevented. In addition, since the beveled portions having a larger inclination angle are formed on the side of the distal end of the prism element, the light rays entering the boundary areas of the pixels may be guided to the pixels, and hence bright display is obtained.

In the electro-optic device according to an aspect of the invention, preferably, the beveled portions arranged on the opening end side of the prism element are formed so as to extend in parallel with the normal line of the converging substrate. In this configuration, the incident angle of the light rays reflected by the beveled portions arranged on the opening end side of the prism element with respect to the pixels is reduced, and hence improvement of the contrast is achieved.

In the electro-optic device according to an aspect of the invention, preferably, light-shielding members are provided on a surface of the converging substrate at positions to cover the opening ends of the prism elements. In this configuration, the light rays reflected by the prism elements cannot enter the light-shielding members easily, so that the light amount and hence the light amount outputted from the converging substrate and entering into the pixels may be increased. Since the light-shielding members are provided directly on the surface of the converging substrate without the intermediary of other members, the electro-optic device may be manufactured in a simple process at low cost.

In the electro-optic device according to an aspect of the invention, a configuration in which a resin layer is formed on the opening ends side of the prism elements is also applicable. In this configuration, since the rough surface of the transparent substrate caused by the prism elements may be flattened by the resin layer, so that the converging substrate may be conveniently used as a substrate constituting the electro-optic device.

An electro-optic device according to an aspect of the invention, which is also applicable, is an electro-optic device having a plurality of pixels arranged in a matrix pattern, including a converging substrate formed of a transparent substrate having groove-shaped prism elements formed in an array pattern, wherein the prism elements are arranged along boundary areas of the pixels, the prism elements each include a plurality of beveled portions arranged on side walls thereof in the direction of the thickness of the converging substrate, and wherein, assuming that light rays reflected by the beveled portions formed on an opening end side of the prism element are first reflected light rays and the light rays reflected by the other beveled portions are second reflected light rays from among the light rays entering the beveled portions from the side opposite from the plurality of pixels at the same incident angle, and the angle of the first reflected light rays with respect to the normal line of the surface of the converging substrate on which the prism elements are formed is a first angle, and the angle of the second reflected light rays with respect to the normal line is a second angle, the angle of the first angle is smaller than the angle of the second angle.

A substrate for an electro-optic device according to an aspect of the invention is a substrate for an electro-optic device which is applicable as a converging member for pixels of the electro-optic device, including a converging substrate formed of a transparent substrate having groove-shaped prism elements formed in an array pattern, wherein the prism elements are arranged along boundary areas of the pixels, each include a plurality of beveled portions arranged on side walls thereof in the direction of the thickness of the converging substrate, and wherein the inclination angle of the beveled portions formed on an opening end side of each of the prism elements with respect to the normal line of the surface of the converging substrate on which the prism elements are formed is smaller than the inclination angle of the other beveled portions with respect to the normal line. According to the substrate for an electro-optic device in this configuration, the electro-optic device which achieves the high efficiency for light utilization supplied from a light source and display superior in brightness and contrast.

An electro-optic device according to another aspect of the invention is an electro-optic device having a light source and an electro-optic panel having a plurality of pixels arranged in a matrix pattern, a converging substrate formed of a transparent substrate having groove-shaped prism elements formed in an array pattern, wherein the prism elements are arranged along boundary areas of the pixels of the electro-optic panel, wherein the prism elements each include beveled portions facing an aperture between the prism elements, and wherein the width B of an opening of the prism element, the depth H of the prism element, the incident angle $\theta L$ of a light ray emitted from the light source and entering the beveled portion from the distal end side of the prism element and being reflected by the beveled portion, and the width W of the aperture between the prism elements satisfy the following expression:

$$H \times \tan(2 \times a \tan(B/2H) + \theta L) - B/2 < W$$

With the electro-optic device according to an aspect of the invention in which the respective parameters are set so as to satisfy the expression shown above, the light rays from the light source which enter the converging substrate, then enter the beveled portions of the prism elements from the distal end sides of the prism elements and then are reflected by the beveled portions are directed toward the apertures. Therefore, the light rays supplied from the light source are caused to enter the pixels quite efficiently, so that the electro-optical device which achieves bright and high contrast display is realized.

Further preferably, the relationship of the depth H of the prism element with respect to the width W of the aperture between the prism elements and the width B of the opening of the prism element satisfies the following expression:

$$H > B + W$$

In this configuration, a problem such that the reflected light rays from the beveled portions are diffused and hence the efficiency for light utilization is lowered may be avoided.

Therefore, it is effective for improvement of the efficiency for light utilization, and more specifically, for utilization in the projector.

In the electro-optic device according to an aspect of the invention, preferably, the side cross-sectional shape of the prism element is a triangle shape. In the case in which the prism element has a triangular cross-section, the inclination angle of the beveled portions is substantially constant from the opening end to the distal end of the prism element. Therefore, the design to which the expression shown above is applied may be applied adequately, and hence intended effects relating the improvement of the efficiency for light utilization are easily obtained.

An electro-optic device according to another aspect of the invention is an electro-optic device having a light source and an electro-optic panel having a plurality of pixels arranged in a matrix pattern, including a converging substrate formed of a transparent substrate having groove-shaped prism elements formed in an array pattern, wherein the prism elements are arranged along boundary areas of the pixels of the electro-optic panel, wherein the prism elements each include beveled portions facing an aperture between the prism elements, wherein the prism elements each are formed into a trapezoidal side cross-section, and wherein the width B of an opening of the prism element, the width A of a flat portion of the prism element, the depth H of the prism element, the incident angle $\theta L$ of the light ray emitted from a light source and entering the beveled portion from the distal end side of the prism element and being reflected by the beveled portion, and the with W of the aperture between the prism elements satisfy the following expression:

$$H \times \tan(2 \times a \tan((B-A)/2H) + \theta L) - (B-A)/2 < W$$

In the electro-optic device according to an aspect of the invention, the prism element may have a trapezoidal side cross-section. In this configuration as well, the electro-optic device which may have the prism element with the design to which the expression shown above is applied, and hence is superior in efficiency for light utilization is realized.

An substrate for an electro-optic device according to another aspect of the invention is a substrate for an electro-optic device which is applicable as a converging member for pixels of the electro-optic device, including groove-shaped prism elements arranged on one surface of a transparent substrate in an array pattern, wherein the prism elements each include beveled portions facing the aperture between the prism elements, wherein the width B of an opening of the prism element, the depth H of the prism element, the incident angle $\theta L$ of a light ray emitted from a light source and incoming from the distal end side of the prism element and being reflected by the beveled portion, and the width W of the aperture between the prism elements satisfy the following expression:

$$H \times \tan(2 \times a \tan(B/2H) + \theta L) - B/2 < W$$

According to the substrate for an electro-optic device in the invention in which the respective parameters are set so as to satisfy the expression shown above, the substrate for an electro-optic device which achieves bright and high-contrast display is realized.

Further preferably, the width H of the prism element, the width W of an aperture between the prism elements, and the width B of an opening of the prism element satisfy the following expression:

$$H > B + W$$

In this configuration, a problem such that the reflected light rays from the beveled portions are diffused and hence the efficiency for light utilization is lowered may be avoided. Therefore, the substrate for the electro-optic element, which is effective for improvement of the efficiency for light utilization, and more specifically, for utilization in the projector is realized.

An substrate for an electro-optic device according to another aspect of the present invention is a substrate for an electro-optic device which is applicable as a converging member for pixels of the electro-optic device, including groove-shaped prism elements arranged on one surface of a transparent-substrate in an array pattern, wherein the prism elements each include beveled portions facing an aperture between the prism elements, the prism elements each are formed into a trapezoidal side cross-section, and wherein the width B of an opening of the prism element, the width A of a flat portion of the prism element, the depth H of the prism element, the incident angle θL of the light ray emitted from the light source and incoming from the distal end side of the prism element and being reflected by the beveled portion, and the width W of the aperture between the prism elements satisfy the following expression:

$$H \times \tan(2 \times a\tan((B-A)/2H)\theta L)-(B-A)/2<W$$

A converging substrate according to an aspect of the invention is a converging substrate including a first main surface on which a plurality of prism elements are formed and a second main surface opposing the first main surface, the plurality of prism elements each having a groove shape, wherein the side walls of the plurality of prism elements each include a first portion and a second portion, and wherein a first angle between the normal line of a flat portion of the first main surface on which the plurality of prism elements are not formed and the first portion is different from a second angle between the second portion and the normal line.

According to the converging substrate, the first portion from among the first portion and the second portion may be located closer to the flat portion than the second portion.

According to the converging substrate, the first angle may be smaller than the second angle.

An converging substrate according to another aspect of the invention including a first main surface on which a plurality of prism elements are formed and a second main surface opposing the first main surface, wherein the width B of an opening of a first prism element from among the plurality of prism elements, the depth H of the first prism element, the incident angle θL of a light ray emitted from the light source, and incoming from the second main surface side and being reflected by side walls of the first prism element, and the width W between the first prism element and a second prism element adjacent to the first prism element from among the plurality of prism elements satisfy the following expression:

$$H \times \tan(2 \times a\tan(B/2H)+\theta L)-B/2<W$$

According to the converging substrate, the side walls of the first prism element may be continued from flat portions of the first main surface where the plurality of prism elements are not formed.

An electro-optic device according to another aspect of the invention includes the converging substrates and an electro-optic panel having a plurality of pixel electrodes, wherein the plurality of prism elements each are provided so as to overlap with an areas between the two adjacent pixel electrodes from among the plurality of pixel electrodes.

A projector according to an aspect of the invention includes the electro-optic device according to an aspect of the invention described above. In this configuration, a projector which achieved bright and high contrast with high reliability is provided.

An electronic apparatus according to an aspect of the invention includes the electro-optic device according to an aspect of the invention described above. In this configurations an electro-optic device having a bright and high-contrast display unit is provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Projector

Figure 1:
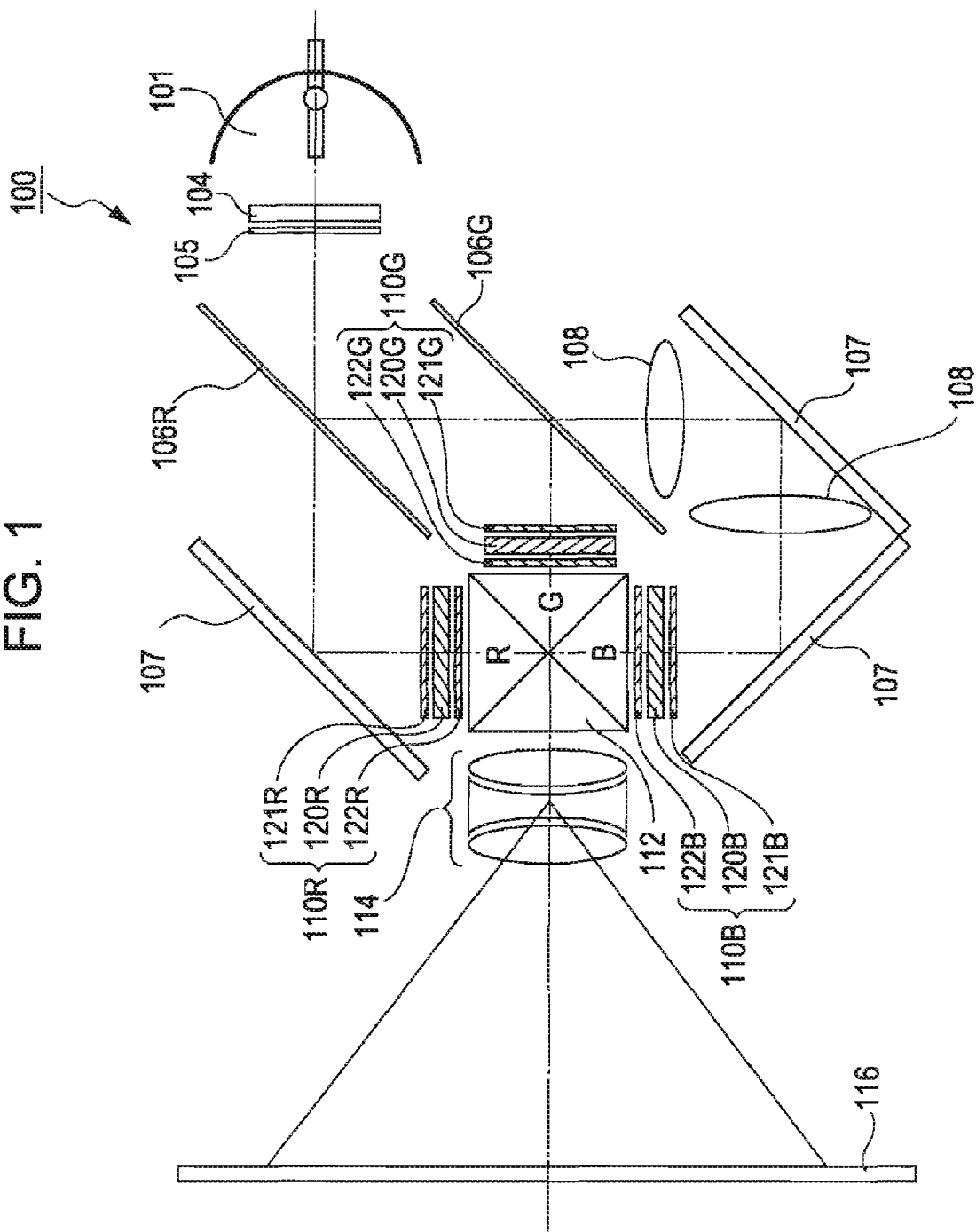
FIG. 1 illustrates a general configuration of a projector according to an embodiment.

Referring now to the drawings, embodiments of the invention will be described.

FIG. 1 illustrates a schematic configuration of a projector according to an embodiment of the invention. As shown in FIG. 1, an extra-high pressure mercury lamp 101 as a light source supplies a light ray including red light as first-color light (hereinafter referred to as "R-light"), green light as second-color light (hereinafter referred to as "G-light"), and a blue light as third-color light (hereinafter referred to as "B-light"). An integrator 104 uniformizes distribution of illumination intensity of light rays supplied from the extra-high pressure mercury lamp 101. The light ray whose distribution of illumination intensity is uniformized by the integrator 104 is converted into a linear polarized light having a specific direction of oscillation, for example, into s-polarized light, by a polarized light converting element 105. The light converted into the S-polarized light enters an R-light transmittable dichroic mirror 106R which constitute a color separating optical system.

The R-light transmittable dichroic mirror 106R selectively transmits the R-light and reflects the C-light and the B-light. The R-light transmitted through the R-light transmittable dichroic mirror 106R enters a reflection mirror 107. The reflection mirror 107 reflects and guides the R-light to a first-color spatial light modulator 110R. The first-color spatial light modulator 110R that modulates the R-light as the first-color light according to image signals is a transmissive liquid crystal device that modulates the R-light according to the image signals.

Since the direction of oscillation of the polarized light does not change even by passing through the dichroic mirror, the R-light entering the first-color spatial light modulator 110R is the s-polarized light.

The first-color spatial light modulator 11OR includes a first polarizing plate 121R, a liquid crystal panel (electro-optic device) 120R and a second polarizing plate 122R and, in addition, a λ/2 wave plate, not shown, is provided on the entrance-side of the first polarizing plate 121R. The configuration of the liquid crystal panel 120R will be described in detail later. The λ/2 wave plate and the first polarizing plate 121R which are arranged on the entrance-side of the first-color spatial light modulator 110R are preferably arranged in a state of being supported by a transparent glass plate. Accordingly, a problem that the first polarizing plate 121R and the λ/2 wave plate are distorted by heat generation is avoided.

In FIG. 1, the second polarizing plate 122R is provided independently, it may be arranged in a state of being in contact with a light-exit plane of the liquid crystal panel 120R or an entrance plane of a cross-dichroic prism 112.

The s-polarized light entering the first-color spatial light modulator 110R is converted into p-polarized light (a linear polarized light whose direction of oscillation is orthogonal to the s-polarized light) by the λ/2 wave plate, then passes through the first polarizing plate 121R and enters the liquid crystal panel 120R. The p-polarized light entering the liquid crystal panel 120R is converted into predetermined elliptically polarized light or the s-polarized light by modulation according to the image signals. Then, polarized components being parallel with an axis of transmission of the second polarizing plate 122R (s-polarized light, from the R-light modulated by a liquid crystal panel 120R go out from the second polarizing plate 122R. In this manner, the R-light modulated by the first-color spatial light modulator 110R enters the cross-dichroic prism 112, which is a color combining optical system.

Subsequently, the G-light will be described. The G-light and the B-light reflected by the R-light transmittable dichroic mirror 106R and separated from the R-light enter a B-light transmittable dichroic mirror 106C. The B-light transmittable dichroic mirror 106G reflects the G-light and transmits the B-light. The G-light reflected by the B-light transmittable dichroic mirror 106G enters a second-color spatial light modulator 110G that modulates the G-light as the second-color light according to the image signals. The second-color spatial light modulator 110C is a transmissive liquid crystal device which modulates the G-light according to the image signals. The second-color spatial light modulator 110G has the liquid crystal panel (electro-optic device) 120G, a first polarizing plate 121G and a second polarizing plate 122G. The liquid crystal panel 120G will be described later in detail.

The G-light entering the second-color spatial light modulator 110G (s-polarized light) passes through the first polarizing plate 121G as is and enters the liquid crystal panel 120G. The s-polarized light entering the liquid crystal panel 120G is converted into predetermined elliptically polarized light or the p-polarized light by the modulation according to the image signals. Then, the polarized light components being parallel with the axis of transmission of the second polarizing plate 122G (p-polarized light) from the G-light modulated by the liquid crystal panel 120G go out from the second polarizing plate 122G. In this manner, the G-light modulated by the second-color spatial light modulator 110G enters the cross-dichroic prism 112, which is a color-combining optical system.

Subsequently, the B-light will be described. The B-light passing through the B-light transmittable dichroic mirror 106G passes through two relay lenses 108 and the two reflection mirrors 107 and enters a third-color spatial light modulator 110B which modulates the B-light as the third-color light, according to the image signals. The third-color spatial light modulator 110B is a transmissive liquid crystal device apparatus which modulates the B-light according to the image signals. The reason why the B-light is caused to pass through the relay lens 108 is because the optical path of the B-light is longer than the optical paths of the R-light and the G-light. Through the usage of the relay lens 108, the B-light passing through the B-light transmittable dichroic mirror 106G can be guided as is to the third-color spatial light modulator 110B.

The third-color spatial light modulator 110B includes a first polarizing plate 121B, a liquid crystal panel (electro-optic device) 120B, and a second polarized plate 122B and, in addition, a λ/2 wave plate, not shown, on the entrance-side of the first polarizing plate 121B. In this manner, since the configuration of the third-color spatial light modulator 110B is the same as the configuration of the first-color spatial light modulator 110R, detailed description will be omitted.

The B-light (s-polarized light) entering the third-color spatial light modulator 110B is converted into the p-polarized light by the λ/2 wave plate disposed on the light entrance-side of the first polarizing plate 121B. The B-light converted into the p-polarized light passes through the first polarizing plate 121B and enters the liquid crystal panel 120B. The B-light (p-polarized light) entering the liquid crystal panel 120B is converted into an elliptically polarized light or the s-polarized light by modulation corresponding to the image signals. The polarized components being in parallel with an axis of transmission of the second polarizing plate 122B (s-polarized light) from the B-light modulated by the liquid crystal panel go out from the second polarizing plate 122B. In this manner, the B-light modulated by the third-color spatial light modulator 110B enters the cross dichroic mirror 106R, which is a color combining optical system. As described above, the R-light transmittable dichroic mirror 106R and the B-light transmittable dichroic mirror 106G which constitute the color separating optical system separate light ray supplied from the extra-high pressure mercury lamp 101 into the R-light as the first-color light, the G-light as the second-color light and the B-light as the third color-light.

The cross-dichroic prism 112 as the color-combining optical system includes two dichroic films arranged so as to be orthogonal into an X-shape. One of the dichroic films is configured to reflect the B-light and transmit the G-light. The other dichroic film is configured to reflect the R-light and transmit the G-light. Accordingly, the cross-dichroic prism 112 is configured to combine the R-light, the C-light and the B-light modulated by the first-color spatial light modulator 110R, the second-color spatial light modulator 110G and the third-color spatial light modulator 110B respectively and allow the same to go out toward a projection lens 114.

The projection lens 114 projects light ray combined by the cross-dichroic prism 112 onto a screen 116. Accordingly, a full-color image can be obtained on the screen 116. In this embodiment, an value of the projection lens 114 is 1.4. The F value here member a value of F expressed by θ=A tan (½F), where θ represents an angle of light rays entering a projecting unit from among the outgoing light rays from the pixels. In this embodiment, since the F value is 1.4, the angle θ of this projection lens 114 is about 19.7°.

As described above, the light rays incoming from the first-color spatial light modulator 110R and the third-color spatial light modulator 110B from among the three spatial light modulators into the cross-dichroic prism 112 are set to be the s-polarized light, and the light rays incoming from the remaining second-color spatial light modulator 110G into the cross-dichroic prism 112 are set to be the p-polarized light. In this manner, through differentiation of the direction of polarization of the light rays entering into the cross-dichroic prism 112, the light rays going out from the respective color spatial light modulators may be combined effectively in the cross-dichroic prism 112. It is because the two dichroic films are generally superior in reflecting the s-polarized light, and hence loss of light rays in the dichroic prism may be reduced by converting the R-light and the B-light reflected by the respective dichroic films into the s-polarized light and the G-light passing through the dichroic films into the p-polarized light.

Liquid Crystal Panel

Figure 2:
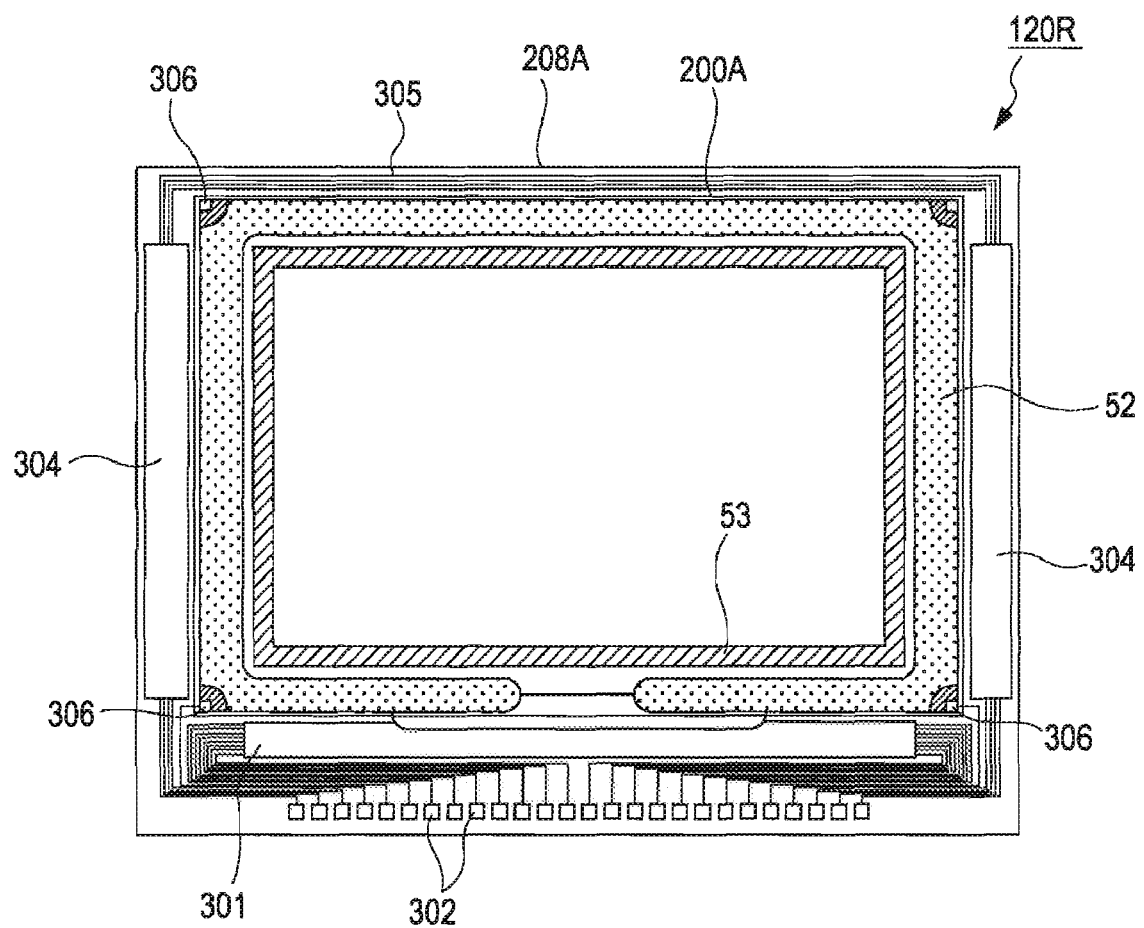
FIG. 2 illustrates a general configuration of the liquid crystal panel according to the embodiment.
Figure 3:
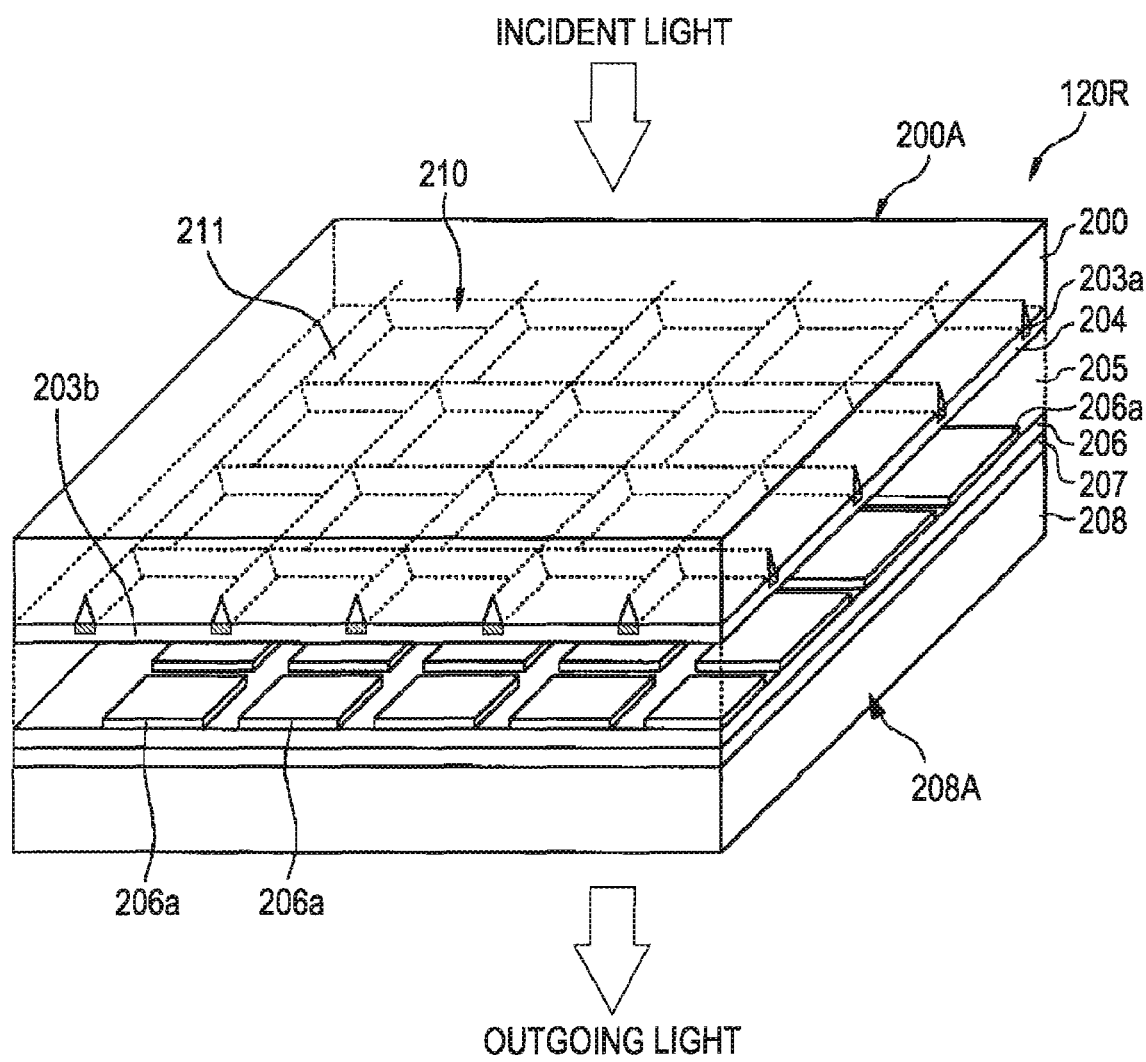
FIG. 3 is a perspective view showing a configuration of the liquid crystal panel according to the embodiment.

Referring now to FIG. 2 and FIG. 3, the liquid crystal panel (electro-optic device) will be described in detail. The projector 100 described In FIG. 1 includes three liquid crystal panels 120R, 120G and 120B. These three liquid crystal panels 120R, 120G and 120B are simply different in range of wavelength of light rays to be modulated, and have the same basic configurations. Therefore, the liquid crystal panel 120R will be described below as an example. FIG. 2 illustrates a general configuration of the liquid crystal panel 120R, and FIG. 3 illustrates a configuration of a partial cross-section of the liquid crystal panel 120R.

As shown in FIG. 2, the liquid crystal panel 120R has a configuration in which a TFT array substrate 208A and an opposed substrate 200A laid one on too of the other, and bonded to each other with a seal member 52 provided therebetween. A liquid crystal layer 205 is encapsulated within an area defined by the seal member 52 (see FIG. 3). A light-shielding film formed of a light-shielding material (peripheral break line) 53 is provided inside the area where the seal member 52 is provided. In the area outside the sealing member 52, a data line driving circuit 301 and external circuit mounted terminals 302 are formed on the TFT array substrate 208A along one side thereof, and with a scanning line driving circuit 304 along two sides which are adjacent to the aforementioned one side thereof. A plurality of wirings 305 for connecting the scanning line driving circuits 304 provided on both sides or an image display area are formed on one remaining side of the TFT array substrate 208A. Provided at corners of the opposed substrate 200A are inter-substrate conducting members 306 for achieving electric conduction between the TFT array substrate 208A and the opposed substrate 200A.

It is also possible to connect a TAB (Tape Automated Bonding) substrate on which a driving LSI is mounted and a terminal group formed in the peripheral portion of the TET array substrate 208A electrically and mechanically via an isotropic conduction film instead of forming the data line driving circuit 301 and the scanning line driving circuit 304 on the TFT array substrate 208A.

Referring now to the illustration of the configuration of the partial cross-section of the liquid crystal panel 120R in FIG. 3, an entrance-side dust proof glass 200 which constitutes a basic body of the opposed substrate 200A is formed with black matrix portions 203a as a light-shielding member and an opposed electrode 204 on an inner surface (the surface on the side of the liquid crystal layer 205) thereof. Provided on the opposed electrode 204 is an alignment layer, not shown, for controlling initial alignment of the liquid crystal layer 205.

The black matrix portions 203a are formed in a lattice pattern on a cover glass 202, and square areas surrounded by the black matrix portions 203a are apertures 203b. Areas corresponding to the apertures 203b are pixels of the liquid crystal panel 120R which allow passage of the R-light from the extra-high pressure mercury lamp 101.

Formed in the entrance-side dust proof glass 200 is a prism group 210 including a plurality of prism elements 211. That is, the entrance-side dust proof glass 200 in this embodiment corresponds to a substrate for an electro-optic device according to an aspect of the invention.

The prism elements 211 each are a optical path deflecting member including a reflection plane including beveled portions 211a and beveled portions 211b, and are adapted to reflect light rays incoming from the interior of the entrance-side dust proof glass 200 by the beveled portions 211a and the beveled portions 211b toward the aperture 203b. As shown in FIG. 2, since the prism elements 211 are arranged so as to surround the pixels, and are provided at positions corresponding to the black matrix portions 203a, the light rays directed toward the black matrix portions 203a from among the light rays entering the liquid crystal panel 120R are reflected and directed toward the apertures 203b, and functions as converging members that improves the efficiency for light utilization.

Although the configuration in which the black matrix portions 203a are formed directly on the inner surface of the entrance-side dust proof class 200 is shown in his embodiment, it is also possible to secure the cover glass via a transparent adhesive layer on the inner surface of the entrance-side dust proof glass 200 and form the black matrix portions 203a on this cover glass. Examples of the cover glass preferable for this application include a quartz glass, a blue plate glass, and a white plate glass.

An exit-side dust proof glass 208 which constitutes a basic body of the TFT array substrate 208A is provided with a TFT substrate 206 via a transparent adhesive layer 207 secured to the inner surface thereof. The TFT substrate 206 is formed thereon with pixel electrodes 206a and TFTs (Thin Film Transistors), not shown, for driving the pixel electrodes 206a. The pixel electrodes 206a are formed in areas which overlap with the above-described apertures 203b in plan view. The TFTs and wirings (not shown) for supplying electric signals to the TFTs are provided in the areas which overlap with the black matrix portions 203a in plan view. An alignment layer, not shown, is formed so as to cover the pixel electrodes 206a, the TFTs and the wirings.

The liquid crystal layer 205 for modulating the transmitted light rays is encapsulated between the TFT array substrate 208A and the opposed substrate 200A. Examples of employable liquid crystal modes of the liquid crystal layer 205 include TN (Twisted Nematic) mode, VAN (Vertical Aligned Nematic) mode, STN (Super Twisted Nematic) mode, ECB (Electrically Controlled Birefringence) mode, and OCB (Optical Compensated Bend) mode.

The R-light from the extra-high pressure mercury lamp 101 enters the liquid crystal panel 120R from the upper side in FIG. 3, passes through the apertures 203b, opposed electrode 204, the liquid crystal layer 205, the pixel electrodes 206a, the TFT substrate 206 in sequence, and goes out from the side of the exit-side dust proof glass 208 toward the cross-dichroic prism 112. At this time, the light amount which passes through the second polarizing plate 122R is controlled pixel-by-pixel by the R-light modulated by the liquid crystal laver 205.

In the configuration shown in FIG. 1, the first polarizing plate 121R and the second polarizing plate 122R are provided separately with respect to the liquid crystal panel 120R. However, it is also possible to provide a polarizing plate between the entrance-side dust proof glass 200 and the opposed electrode 204, or between the exit-side dust proof class 208 and the TFT substrate 206 instead.

Figure 4:
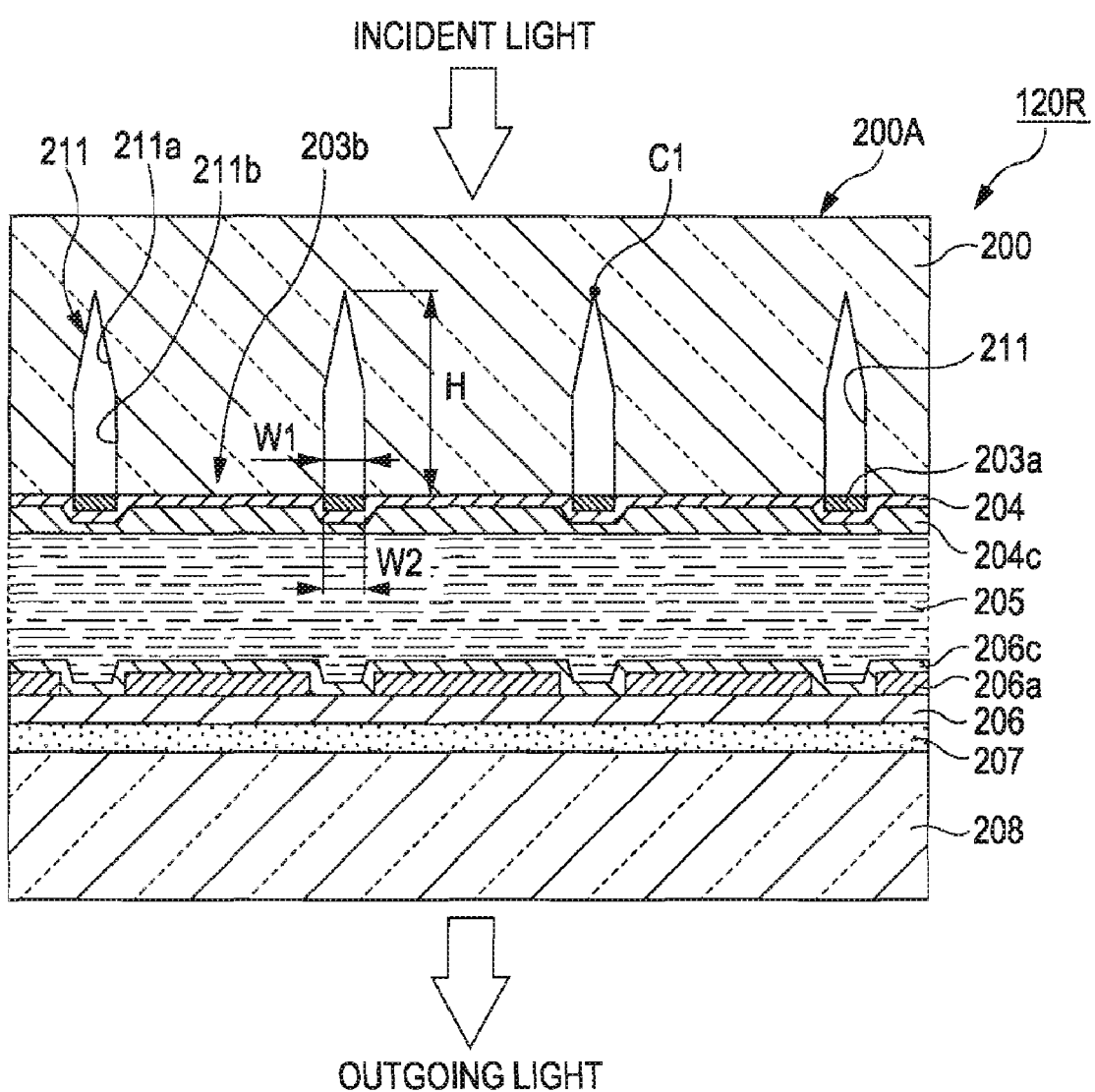
FIG. 4 illustrates a configuration of a partial cross-section of the liquid crystal panel according to the embodiment.

Subsequently, FIG. 4 illustrates a configuration of the partial cross-section of the liquid crystal panel 120R. The prism elements 211 correspond to light-path deflecting members formed into a groove-shape from the side surface of the liquid crystal laver 205 of the entrance-side dust proof glass 200 toward the interior thereof, and the interior of each prism element 211 is hollow. The cross-section of the prism element 211 is a tapered shape of a rocket (pencil) shape as shown in FIG. 4, and is formed with two beveled portions 211a, 211b from the opening end side (the side of the liquid crystal layer 205) in the direction of the depth of the prism element 211. As shown in the drawing, the inclination angles of the beveled portions 211a, 211b with respect to the direction of the normal line of the entrance-side dust proof glass 200 (the vertical direction in the drawing) are different from each other. The beveled portions 211b are substantially parallel with the normal line, and the beveled portions 211a are inclined with respect to the direction of the normal line by a predetermined angle. The beveled portions 211b having a smaller inclination angle (close to the direction parallel with the direction of the normal line) are arranged on the opening end side of the prism element 211, and the two beveled portions 211a, 211b oppose to each other on the left and right sides in the drawing so as to form a groove having the width gradually decreasing in the direction of the depth of the prism element 211. The interior of the prism element 211 having the beveled portions 211a, 211b is hollow, and hence the refractive index is almost the same as air, which is lower than the refractive index of the entrance-side dust proof glass 200. Therefore, the light rays passing through the entrance-side dust proof glass 200 may be reflected by the beveled portions 211a, 211b.

The black matrix portions 203a are provided so as to cover the opening ends of the prism elements 211. More specifically, distal ends C1 of the prism elements 211 are positioned substantially at the widthwise (in the lateral direction in the drawing) centers of the black matrix portions 203a, and the width W1 of the opening of the prism element 211 of the black matrix portion 203a and the width W2 of the black matrix portion 203a substantially match. Therefore, the light rays entering the prism elements 211 are reflected toward the apertures 203b. Furthermore, the areas in the vicinity of the black matrix portions 203a which do not contribute to display may be used effectively.

Although the width of each of the black matrix portions 203a substantially matches each of the opening ends of the prism elements 211 in this embodiment, while the interior of each of the prism elements is hollow in this embodiment, such a structure may be achieved easily by forming the black matrix portions 203a on the entrance-side dust proof glass 200. That is, since the width W1 of the opening end of each of the prism elements 211 is on the order of several μm, when a Cr film or the like which constitutes the black matrix portions 203a is formed on the surface of the entrance-side dust proof glass 200, the Cr film is accumulated in the vicinity of the opening ends and closes the prism elements 211 without being filled in the interiors of the prism elements 211. Therefore, the structure shown in FIG. 4 may be obtained easily by patterning the Cr film by a photolithography process.

In order to prevent the black matrix portions 2103a from entering the interiors of the prism elements 211 further reliably, a resin material may be provided at the opening ends of the prism elements 211 prior to the formation of the black matrix portions 203a. In this case, the resin material is preferably a material having a smaller refractive index than the entrance-side dust proof glass 200. In this configuration, the light rays proceeding in the entrance-side dust proof glass 200 may be reflected even at portions where the resin material is provided, so that lowering of the efficiency for light utilization is prevented.

Figure 5:
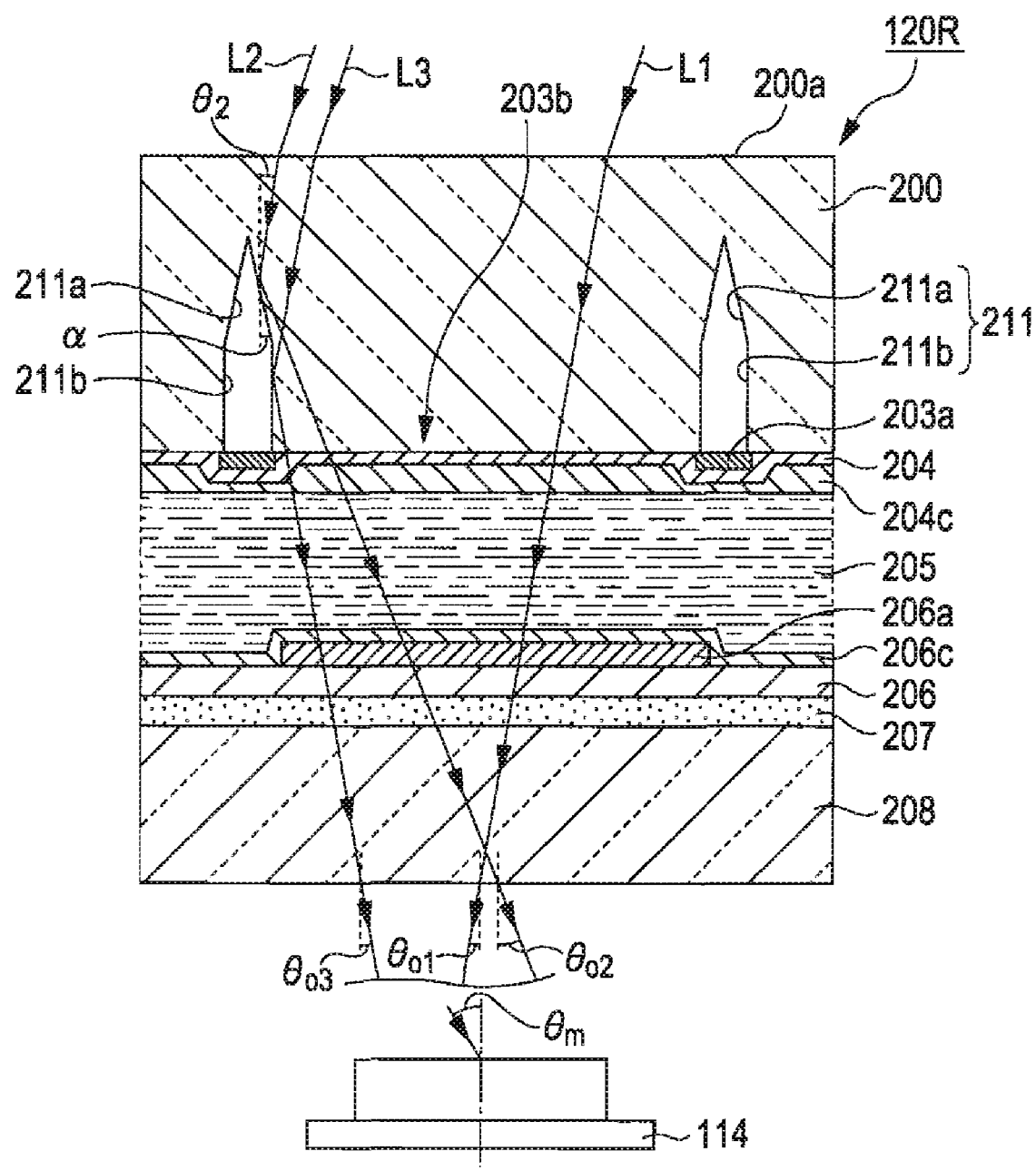
FIG. 5 is an explanatory drawing showing an operation of a prism element.

Referring now to FIG. 5, the operation of the prism elements 211 will be described. FIG. 5 illustrates a configuration of a partial cross-section of the liquid crystal panel 120R in one pixel for explaining the operation of the prism element 211. According to the optical path generally shown in FIG. 5, light rays L1, L2, L3 entering the liquid crystal panel 120R proceed toward the exit-side dust proof glass 208 while being reflected or refracted on an interface having a difference in refractive index.

In the description in FIG. 5, the optical path is shown so that the light rays proceed straight through the interface having a minute difference in refractive index for the simplicity of description.

A light ray L1 which enters directly into the aperture 203b without passing through the prism element 211 will he described. The light ray L1 proceeding in air enters the entrance-side dust proof glass 200 formed of, for example, a quartz glass from an entrance plane 200a. The light ray L1 enters the liquid crystal layer 205 through the entrance-side dust proof glass 200 and the opposed electrode 204 and is modulated according to the state of alignment of the liquid crystal in the liquid crystal layer 205. The light ray L1 modulated according to the image signal's passes through the adhesive layer 207 and goes out from the exit-side dust proof glass 208. Since the outgoing angle $\theta o1$ of the light ray L1 is smaller than the maximum angle $\theta m$ determined by the NA of the projection lens 114, the light ray L1 is projected to the screen 116, not shown, via the projection lens 114.

The light ray L2 which enters a position different from the light ray L1 will be described. The light ray L2 enters the entrance-side dust proof glass 200 through the entrance plane 200a. The light ray L2 proceeding in the entrance-side dust proof glass 200 enter the beveled portion 211a of the prism element 211. As the prism element 211 is hollow and has the refractive index smaller than that of the entrance-side dust proof glass 200, the light ray is reflected by the beveled portion 211a and enters the aperture 203b. The light ray L2 entering the aperture 203b proceeds in the same manner as the light ray L1 described above, and goes out from the exit-side dust proof glass 208.

The relationship among the incident angle, the reflecting angle, and the outgoing angle of the light ray L2 will now be described.

The entrance-side dust proof glass 200 is a parallel plate having the entrance plane 200a and an exit plane which is parallel with the entrance plane 200a. The angle formed between the normal line of the entrance plane 200a and an optical axis of the light ray L2 is assumed to be the incident angle θ2, and the inclination angle of the beveled portion 211a with respect to the normal line of the entrance plane 200a is represented by α. The angle formed by the light ray L2 proceening In the liquid crystal panel 120R and outgoing from the exit-side dust proof glass 208 is assumed to be the outgoing angle θo2.

The light ray L2 is refracted due to the difference in refractive index at the interface between the opposed electrode 204 and an alignment layer 204c, the interface between the alignment layer 204c and the liquid crystal layer 205, an interface between the liquid crystal layer 205 and an alignment layer 206c, and an interface between the alignment layer 206c and the pixel electrode 206a. However, for the simplicity of the description of the operation of the prism element 211, it is assumed that the light ray L2 proceeds almost straight through these interfaces. Under such an assumption, the following expression (1) is established.

$$\alpha = (1/2) \cdot (\theta o2 - \theta 2) \quad (1)$$

As is clear from the expression (1) shown above, the incident angle θ2 of the light ray L2 may be converted into the outgoing angle θo2 before going out by setting the inclination angle α of the beveled portions 211a as needed. The light ray L2 may be caused to be projected onto the screen 116, not shown, by setting the outgoing angle θo2 of the light ray L2 to a value smaller than the maximum angle θm determined by the NA of the projection lens 114.

Subsequently, the light ray L3 entering the beveled portion 211b of the prism element 211 will be described. The light ray L3 enters from the entrance plane 200a, proceeds in the entrance-side dust proof glass 200, is reflected by the beveled portion 211b, and then enters the aperture 203b. The light ray L3 entering the aperture 203b proceeds in the same manner as the light ray L1 described above, and goes out from the exit-side dust proof glass 208. Assuming that the outgoing angle of the light ray L3 is θo3, since the beveled portions 211b are formed to be substantially vertical to the entrance plane 200a, the angle formed between the entrance plane 200a and the beveled portion 211b is smaller than the angle α of the beveled portion 211a, so that the light ray L3 reflected regularly by the beveled portion 211b goes out substantially at the same angle as the incident angle with respect to the beveled portion 211b and then enters the aperture 203b. Under the same conditions as the light ray L2, the outgoing angle θo3 of the light ray L3 matches the incident angle with respect to the beveled portion 211b, and is smaller than the outgoing angle θo2 of the light ray L2.

In this manner, with the configuration of the prism element 211 which includes the beveled portions 211b which are substantially vertical to the entrance plane 200a provided on the opening end side of the prism element with respect to the beveled portions 211a which are inclined at a predetermined inclination angle, all the light rays incoming from the entrance plane 200a and proceeding in any directions are guided toward the apertures 203b, and the light rays guided to the apertures 203b are prevented from concentrating at the centers of the pixels when entering.

Therefore, as regards the light ray L3 reflected by the beveled portion 211b and entering the aperture 203b, the limitation of the maximum angle θm determined on the basis of the F value of the protection lens 114 is alleviated, and hence the components to be projected onto the screen 116 from the projection lens 114 increase. Consequently, the light amount to be projected increases even with the same amount of incident light rays as in the case in which the beveled portions which constitute the side walls of the prism element have a uniform inclination angle, so that bright display is obtained.

As described above, the light rays L1, L2 having various incident angles proceed to the apertures 203b, for example, from the extra-high pressure mercury lamp 101 as a light source. The light ray L1 which enters the aperture 203b without passing through the prism element 211 is modulated according to the image signals without being changed, and goes out from the exit-side dust proof glass 208. In contrast, the light ray L2 entering toward the black matrix portion 203a, which is non-modulating portion around the aperture 203b, enters the prism element 211, which is light-path deflecting member, provided around the aperture 203b. The light ray L2 entering the prism element 211 is reflected toward the aperture 203b. Accordingly, the light ray L2 which does not enter the aperture 203b in itself is efficiently guided toward the aperture 203b by having their optical path deflected by reflection.

Furthermore, the light ray L1 goes out from the liquid crystal panel 120R without having their optical path deflected significantly. Unlike the microlens, the prism element 211 has no converging function. Therefore, the outgoing angle θo2 of the light ray L2 reflected by the beveled portion 211a of the prism element 211 is not extremely different from the incident angle θ2. The light ray L3 reflected by the beveled portion 211b of the prism element 211 is a light ray having the smaller outgoing angle θo3 than the light ray L2, which is close to the parallel rav. Therefore, the light rays entering the liquid crystal panel 120R go out from the liquid crystal panel 120R as substantially parallel rays even after having modulated, and are projected on the screen 116 without being rejected by the projection lens 114. As described thus far, in this embodiment, increase in ray angle of the light rays L1 to L3 which go out from the first-color spatial light modulator First-color spatial light modulator 110R may be prevented in addition to the fact that the light rays L1 to L3 are guided efficiently to the apertures 203b. Therefore, the light rays going out from the liquid crystal panel 120R are projected without being rejected by the projection lens 114, and hence a bright projected image can be effectively obtained.

When the incident light rays are converged into the liquid crystal layer 205, the alignment layer or the liquid crystal molecules may be deteriorated due to concentration of energy. Although the prism elements of the groove shape formed on the substrate do not have lens components such as the microlens, the light rays reflected by the prism elements tend to concentrate at the centers of the pixels when entering therein. In contrast, in this embodiment, the prism elements 211 are provided with the beveled portions 211*b* having a small inclination angle on the opening ends side of the prism elements 211, the light rays are prevented from concentrating at the centers of the pixels when entering therein, and hence the distribution of the light amount in the pixel may be uniformized. Therefore, since the incident light rays enter the alignment layer and the liquid crystal layer which constitute the light modulation element substantially uniformly without concentrating to specific parts, concentration of energy described above is avoided. Accordingly, the lifetime of the alignment layer or the liquid crystal layer is elongated and, furthermore, the lifetime of the liquid crystal panel 120R is also elongated.

Although the interior of the prism element 211 does not have to be necessarily hollow, the prism element 211 preferably has a refractive index which causes the incident light ray L2 to be totally reflected toward the aperture 203*b* corresponding to the pixels in order to reduce the loss of the light amount by reflection. In order to cause the incident light rays to be reflected totally by the beveled portions 211*a* or the beveled portions 211*b*, it is necessary to satisfy the condition of the following expression (2).

$$\sin\theta in = n2/n1 (n1 > n2) \qquad (2)$$

In this expression, θin represents the incident angle of the light ray with respect to the normal line of the beveled portion, n1 represents the refractive index of the entrance-side dust proof glass 200, and n2 represents the refractive index of the prism element 211, respectively. For example, in the case in which the incident angle θ2 of the light ray L2 shown in FIG. 5 is 12° (θ2=12°), the refractive index n1 for causing the total reflection is 1.46 (quartz) and the refractive index n2 for the same is 1.43.

Manufacturing Method

Subsequently, the procedure for forming the prism elements 211 and the black matrix portions 203*a* on the entrance-side dust proof glass 200 in the liquid crystal panel 120R configured as described above will be described. FIGS. 6A to 6D illustrate a procedure for forming the prism elements 211, and FIGS. 7A and 7B illustrate a procedure for forming the black matrix portions 203*a*.

The prism elements 211 may be formed by a method using a laser application or a method using a dry etching process. The procedure shown from FIGS. 6A to 6D is a method of forming the prism elements 211 by the dry etching process using a thick film resist.

Figure 6A:
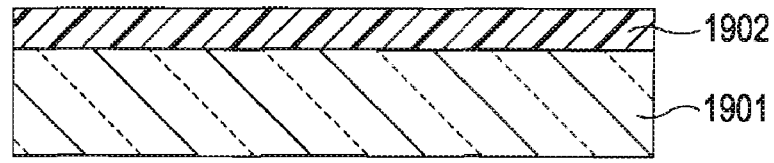
FIGS. 6A to 6D are cross-sectional process drawings for explaining a method of manufacturing the liquid crystal panel.
Figure 6B:
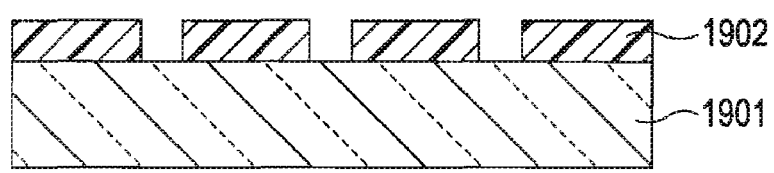
Figure 7A:
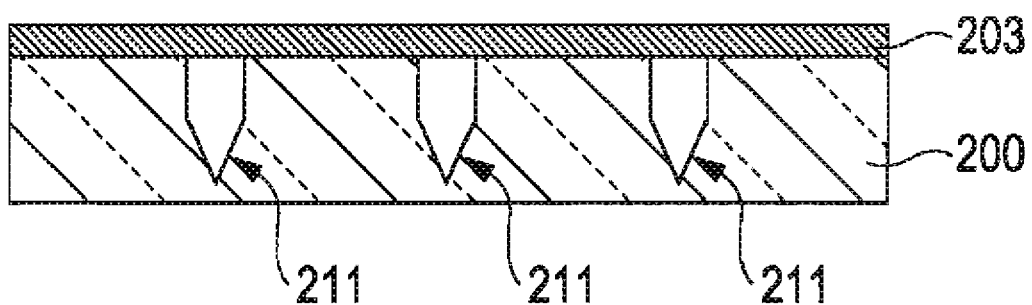
FIGS. 7A and 7B are cross-sectional process drawings for explaining a method of manufacturing the liquid crystal panel.
Figure 7B:
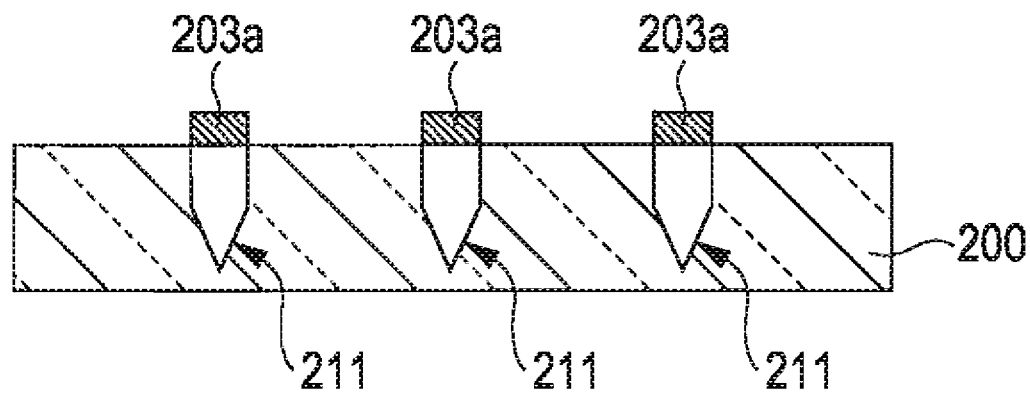

As shown in FIG. 6A, a substrate 1901 is formed with a resin resist layer 1902. The substrate 1901 may be a glass substrate or a transparent resin substrate, and the liquid crystal panel 120R in this embodiment is a dust proof class. The resin resist layer 1902 is a mask layer, and is applied by a thickness of, for example, 50 μm to 200 μm. For example, SU-8, KMPR (both are registered trademark of Micro Chem Corp) may be used as the resin resist layer 1902. Subsequently, as shown in FIG. 6B, exposure and development processes are performed to remove portions of the resin resist layer 1902 where the prism elements 211 are to be formed. Then, it is baked for about 60 minutes at a temperature of approximately 100° C.

Figure 6C:
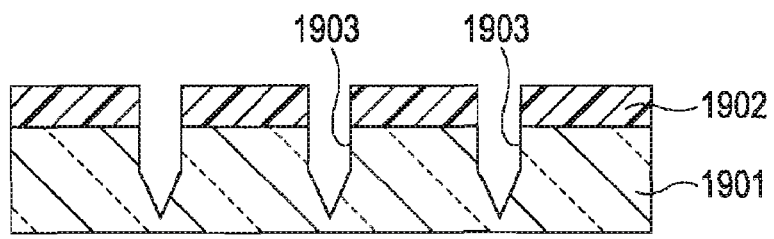

Subsequently, the dry etching process is performed using the patterned resin resist layer 1902 as a mask. The dry etching is performed using, for example, an ICP dry etching device which is able to form high-density plasmas. Grooves 1903 of a rocket shape in cross-section are formed in the substrate 1901 by the dry etching process as shown in FIG. 6C. Preferably, fluoride based gas such as $C_4F_8$ or $CHF_3$ is used as etching gas which is capable of forming the high-density plasmas uniformly in an etching area.

In the above-described dry etching process, the grooves 1903 having a depth about four times the thickness of the resin resist layer 1902 may be formed in the substrate 1901 by setting the etching selectivity between the material of the substrate 1901 and the material of the resin resist layer 1902 to, for example, four part to one. The two beveled portions 211*a*, 211*b* of the prism elements 211 having different inclination angles may be formed by controlling the composition of the etching gas, or the substrate temperature or the pressure at the time of etching. In the etching process, carbonization of the resist due to the etching environment may be prevented by cooling the substrate 1901 by a chiller, or providing cooling time between etching cycles. The dry etching process using SU-8 is described in, for example, Takayuki Fukasawa et al, "Deep Dry Etching of Quartz Plate Over 100 μm in Depth Employing Ultra-Thick Photoresist (SU-8)" (Japanese Journal of Applied Physics. Vol. 42 (2003) pp 3702-3706, The Japan Society of Applied Physics). After having formed the grooves 1903, the resin resist layer 1902 remaining on the substrate 1901 is removed.

Figure 6D:
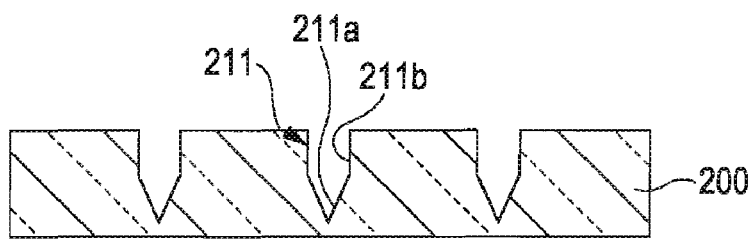

Wall surfaces of the grooves 1903 formed in this manner correspond to the beveled portions 211*a*, 211*b* of the prism elements 211 as shown in FIG. 6D. Then, air or other transparent substance is sealed in the grooves 1903 to form the prism elements 211. When sealing air in the prism elements 211, it is preferable to depressurize the interiors of the prism elements 211 By depressurizing the interiors of the prism elements 211, thermal expansion of air in the prism elements 211 due to temperature increase is alleviated, so that the parts in the vicinity of the prism elements 211 are prevented from coming off.

Referring now to FIGS. 7A and 7B, a process of forming the black matrix portions 203*a* on the entrance-side dust proof glass 200 formed with the prism elements 211 will be described.

As shown in FIG. 7A, for example, a light-shielding film 203 formed of metal material such as Cr or Al, or black resin is formed on the entrance-side dust proof glass 200 having the prism elements 211 formed therein. Known film forming methods such as a spattering method or a CVD method may be used as a method of forming the light-shielding film 203, and the film thickness of the light-shielding film 203 is, for example, about 1 μm. At this time, since the opening ends of the prism elements 211 having a width of several μm are closed by the light-shielding film 203, the light-shielding film 203 is not formed inside the prism elements 211.

Subsequently, by patterning the light-shielding film 203 using the photolithography method, the black matrix portions 203*a* are formed so as to cover the pattern of the prism elements 211 in plan view as shown in FIG. 7B. Subsequently, the opposed substrate 200A is manufactured by forming the opposed electrode 204 and the alignment layer 204*c*. Then, it is bonded with a separately manufactured TFT array substrate 208A and the liquid crystal layer 205 is sealed between the substrates, so that the liquid crystal panel 120R is manufactured.

ANOTHER EMBODIMENT

Figure 8:
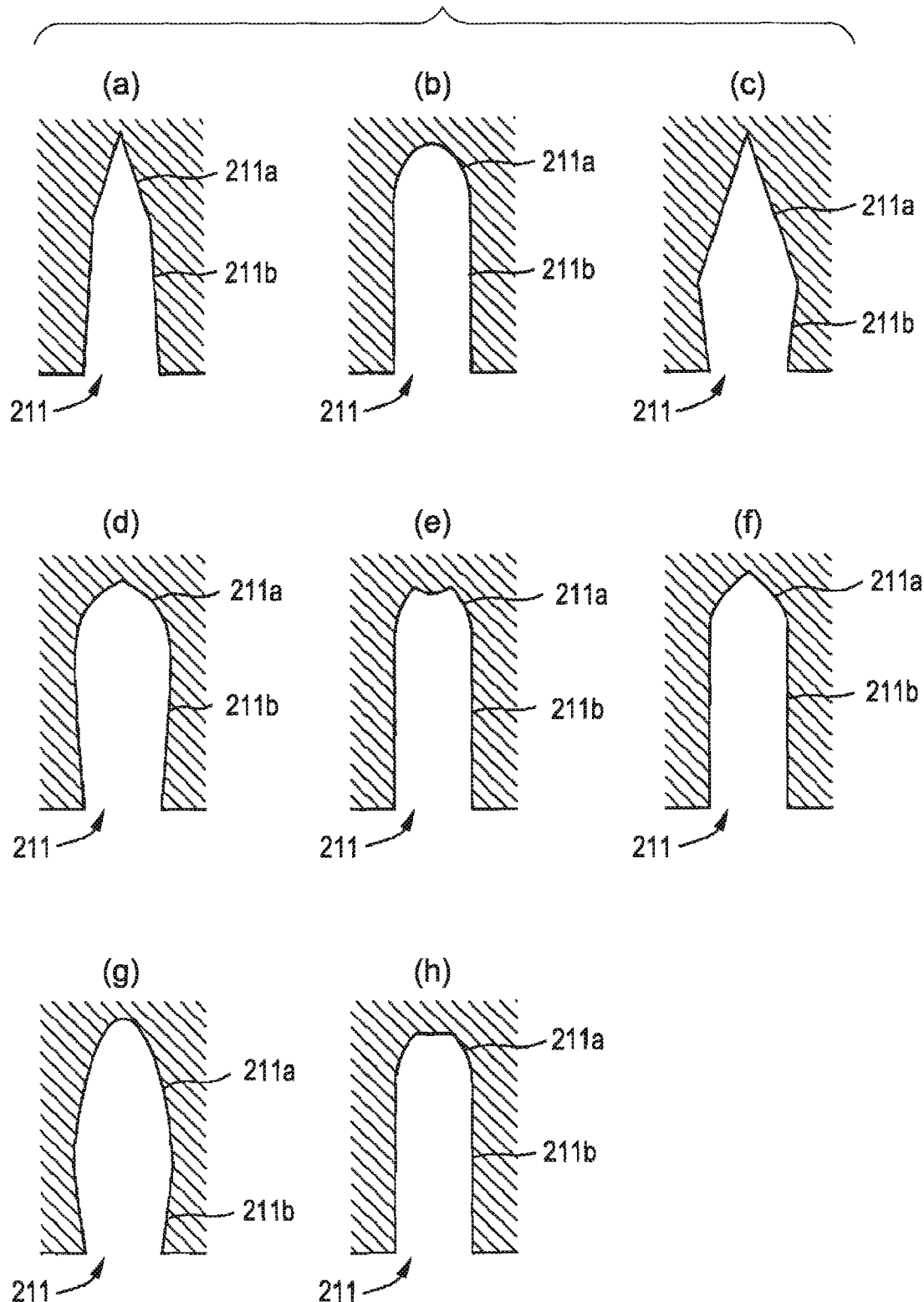
FIG. 8 illustrates partial cross-sections showing examples of other configurations of the prism element.

Although the case in which the prism elements 211 have a rocket shape (pencil shape) in cross-section has been described in the above-described embodiment, the technical scope of the invention is not limited to the above-described embodiment. Referring now to exemplified plural configurations shown in FIG. 8, the cross-sectional shape of the prism elements will be described. FIG. 8 illustrates cross-sections showing examples of other configurations of the prism element.

The prism elements provided in the electro-optic device according to an aspect of the invention each have a plurality of beveled portions in the direction of the depth thereof, and beveled portions having the smallest inclination angle from among the plurality of beveled portions are arranged on the opening end side of the prism element. It may have a configuration in which three or more of the beveled portions are arranged in the direction of the depth of the prism elements, or a configuration in which the respective beveled portions do not have a flat shape, but have a curved shape. They may be formed so as to be tapered toward the distal end (the bottom portion of the groove) of the prism element, or they may be partly protruded outward in cross-section.

The prism elements 211 shown as (a) to (h) in FIG. 8 all have the plurality of beveled portions 211a, 211b arranged in the direction of the depth.

The outer peripheries of the plurality of beveled portions (a) and (c) shown in FIG. 8 form a bent line in cross-section. In contrast, the outer peripheries of the plurality of beveled portions (b), (e), (f), (g) and (h) in FIG. 8 continue smoothly without forming the bent line in cross-section, and one of the beveled portions has a curved outer periphery. The inclination angle of the beveled portions having the curved outer periphery with respect to the normal line of a surface of the converging substrate on which the prism element is formed is defined as an angle of an arbitrary tangent line of the curve with respect to the normal line. The inclination angles of the beveled portions 211a and the beveled portions 211b are defined as the angles θa, θb with respect to the normal line (shown by broken line) of the converging substrate shown in the prism elements 211 shown as (a), (c), and (h) in FIG. 9 which correspond to the beveled portions (a), (c), and (h) in FIG. 8.

In the electro-optic device in this invention, the prism element is preferably configured in such a manner that the beveled portions on the opening ends side each have a shape which makes the opening smaller, that is, the beveled portions on the opening end side each are inclined to form a negative angle with respect to the normal line of the converging substrate, where the angle formed clockwise is assumed to be the positive angle like the shapes shown in (c), (e) and (g) in FIG. 8. In this configuration, even the light rays have a large incident angle with respect to the normal line, the incident angle of the light rays reflected by the beveled portions arranged on the opening end side and entering the pixels may become close to the direction parallel to the normal line, so that the contrast is improved.

The inclination angle of the beveled portions on the opening end side having the curved outer periphery in cross-section is defined to be an angle formed between a tangent line of the outer periphery at a point deviated about 1 μm from the opening end toward the incident light ray and the normal line. In this case as well, uniformity of the intensity of the light rays in the pixels is achieved owing to the fact that the inclination angle of the beveled portions on the opening end side is smaller than the inclination angle of the other beveled portions.

In the case of the prism elements 211 shown as (a), (b) (e), (f) and (h) in FIG. 8, the inclination angle of the beveled portions 211b arranged on the opening end side is smaller than the inclination angle of the beveled portions 211a, respectively.

Figure 9:
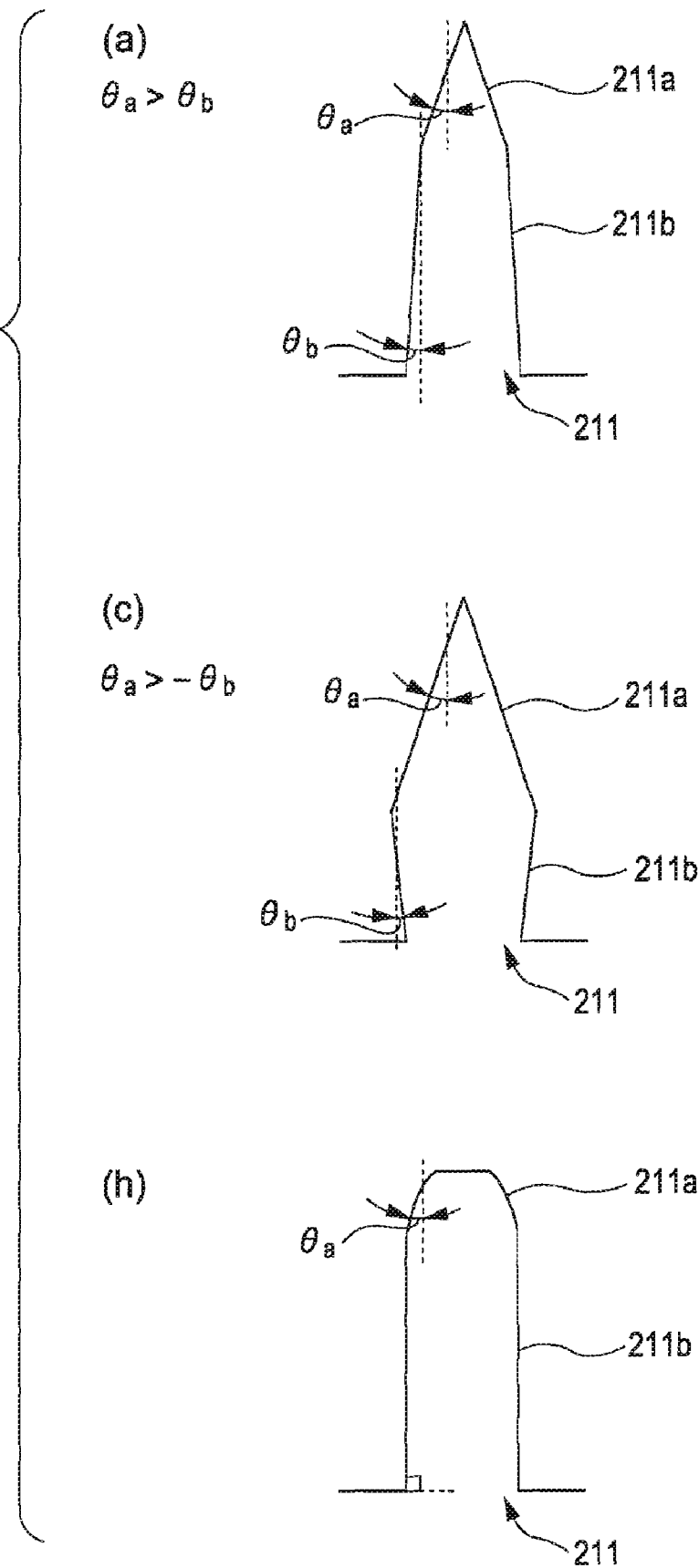
FIG. 9 illustrates explanatory drawings showing inclination angles of respective beveled portions of the prism element.
Figure 10:
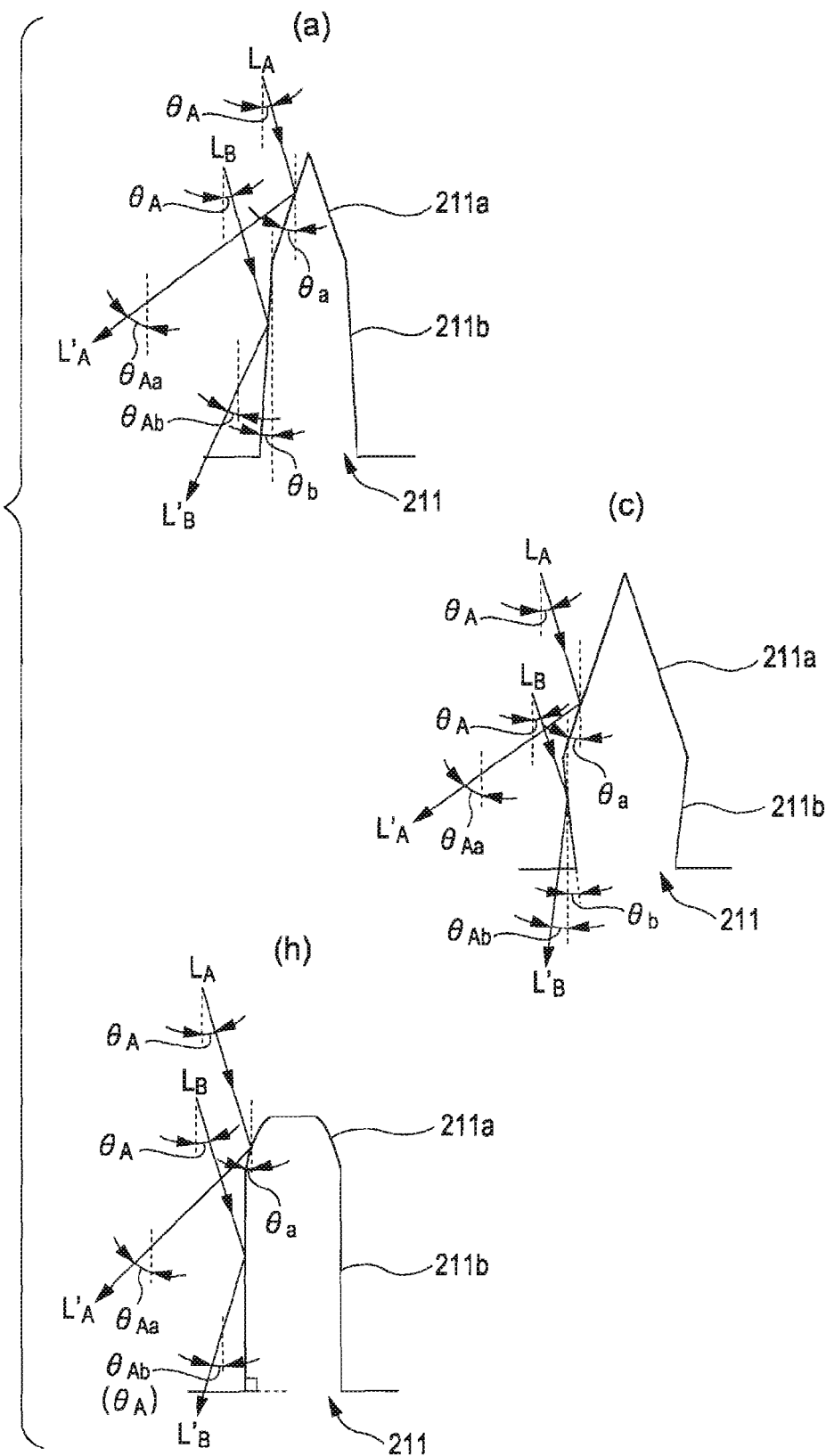
FIG. 10 is an explanatory drawing showing reflection modes at the respective beveled portions of the prism element.

FIG. 10 illustrates cross-sections for explaining reflection modes of the light rays entering the prism elements 211 corresponding to FIG. 8 shown in FIG. 9.

As shown in a cross-section (a) in FIG. 10, light rays $L_A$ and $L_B$ entering at the same angle $\theta_A$ with respect to the normal line of the converging substrate are guided to the pixel (aperture 203b) as apertures as reflected light rays $L_A{'}$, $L_B{'}$ according to the angles of reflection surfaces (the inclination angles θa, θb of the beveled portions 211a, 211b). Here, the incident light ray $L_A$ enters at the angle of $\theta_A$ with respect to the normal line of the converging substrate, and the reflected light ray $L_{A'}$ reflected by the beveled portion 211a proceeds toward the portion in the vicinity of the center of the pixel at the angle of $\theta_A$a. On the other hand, the incident light ray $L_B$ is reflected by the beveled portion 211b having the inclination angle θb (<θa), and the reflected light ray $L_{B'}$ proceeds to an area of the aperture 203b close to the opening end of the prism element 211 at the angle of $\theta_{Ab}$ which is the angle of the incident light ray $\theta_A$+θb×2. In this manner, according to the prism element 211 in this embodiment, uniformity of the intensity of the light rays in the pixels is achieved since the directions that the light rays are guided by reflection differ depending on the portion where the light rays are reflected even when the angles of the incident light rays are the same.

In the example shown in a cross-section (c) in FIG. 10, the beveled portions 211b formed on the opening end side are formed at negative angles with respect to the normal line of the converging substrate, and hence the angle $\theta_{Ab}$ of the light ray $L_{B'}$ as the reflected light ray of the light ray $L_B$ entering the beveled portion 211b is smaller than the incident angle $\theta_A$, and hence is closer to the parallel light. Therefore, it is effective for improving the contrast. In the same manner, the light ray guided forward is also close to the direction parallel to the normal line, it is specifically effective for the projector in which the angle of light rays entering a projecting unit from among the outgoing light rays from the pixels is determined by the F value or the like of the projection lens from the viewpoint of improvement of the efficiency for light utilization.

In the same manner, in the example shown in a cross-section (h) in FIG. 10 as well, when the incident light rays $L_A$, $L_B$ enter at the same angle with respect to the normal line, they are guided to the pixel as the reflected light rays $L_{A'}$, $L_{B'}$ according to the angle of the reflection surface (the inclination angles of the beveled portions 211a, 211b). Here, the incident light ray $L_A$ enters at the angle of $\theta_A$, and the reflected light ray $L_A$ reflected by the beveled portion 211a proceeds toward the portion in the vicinity of the center of the pixel at the angle of $\theta_{Aa}$. On the other hand, the light ray $L_B$ is reflected by the beveled portion 211b which is substantially parallel with the normal line of the converging substrate (θB is substantially 0°) Therefore, the reflected light ray LB' proceeds in the direction at an angle of $\theta_{Ab}$ which is substantially the same as the angle of the Incident light ray $\theta_A$ to proceed to an area of the aperture 203b close to the opening end of the prism element 211 In this manner, according to the prism element 211 in this embodiment, uniformity of the intensity of the light rays in the pixels is achieved since the directions that the light rays are guided by reflection differ depending on the portion where the light rays are reflected even when the angles of the incident light rays are the same.

Therefore, when the liquid crystal panel is configured using a substrate provided with the prism elements 211 shown in FIG. 8, the light rays can be guided efficiently with respect to the aperture of the pixel, and the uniformity of the light rays entering the opening can also be enhanced, so that a liquid crystal panel which can display at high brightness, and is superior in reliability is achieved.

Figure 11:
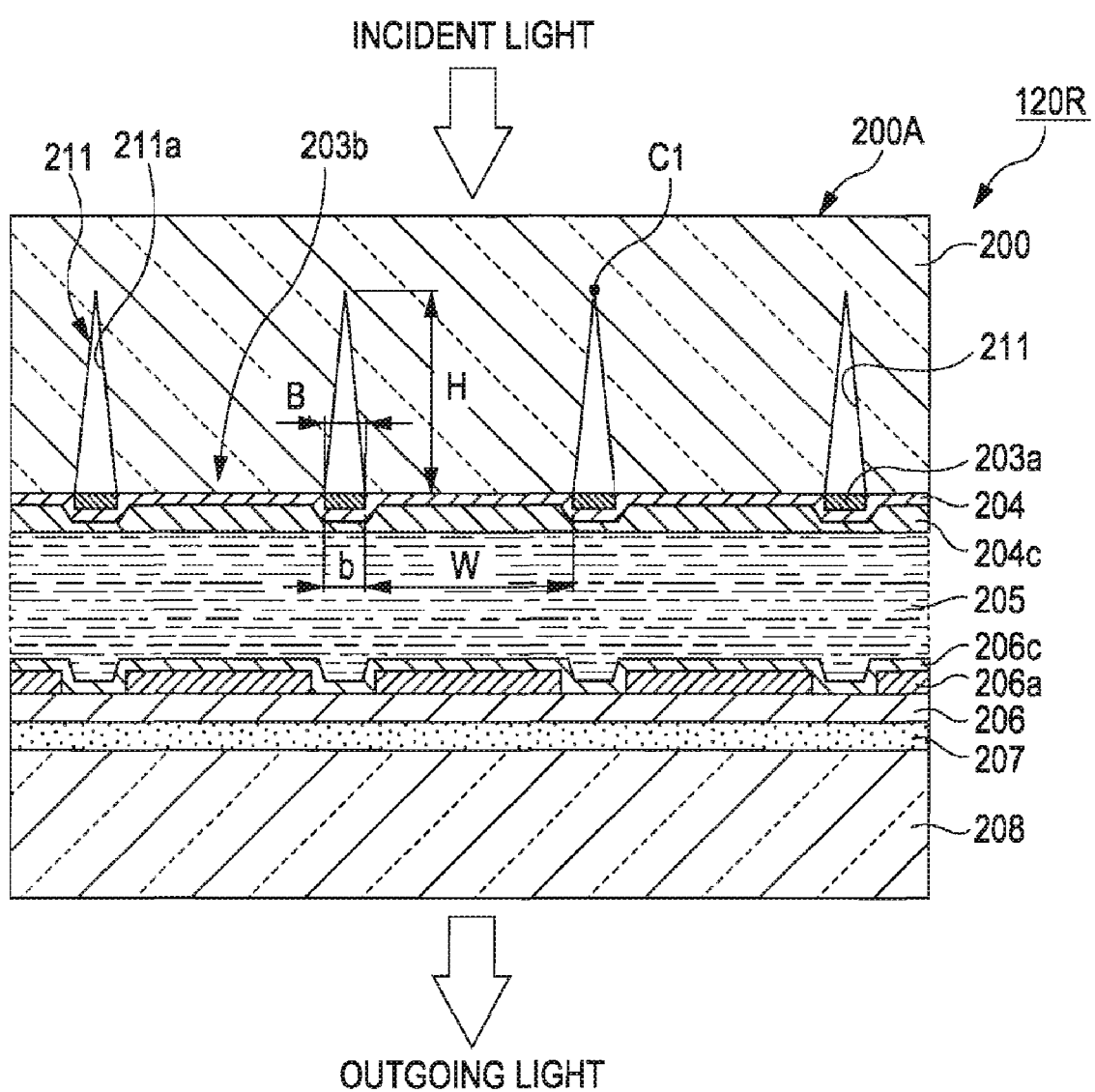
FIG. 11 illustrates a configuration of the partial cross-section of the liquid crystal panel according to the embodiment.

The prism elements 211 according to another embodiment are optical path deflecting members each having reflection surfaces including the beveled portions 211a which constitute side walls of a groove formed on the entrance-side dust proof glass 200 as shown in FIG. 11, and are configured to reflect the light rays incoming from the interior of the entrance-side dust proof glass 200 by the beveled portions 211a and direct the same toward the apertures 203b. As shown in FIG. 3, they are arranged so as to surround the pixels. That is, the prism elements 211 are arranged so as to overlap with the areas between the two adjacent pixel electrodes 206a. Since they are provided corresponding to the positions where the black matrix portions 203a are formed, the prism elements 211 function as converging members for reflecting the light rays proceeding toward the black matrix portions 203a from among the light rays entering the liquid crystal panel 120R and directing the same toward the apertures 203b to improve the efficiency for light utilization.

Although the configuration in which the black matrix portions 203a are formed directly on the inner surface of the entrance-side dust proof glass 200 is shown in this embodiment, it is also possible to secure the cover glass via a transparent adhesive layer on the inner surface of the entrance-side dust proof glass 200 and form the black matrix portions 203a on this cover glass. Examples of the cover glass preferable for this application include a quartz glass, a blue plate glass, and a white plate glass.

As shown in FIG. 3, the exit-side dust proof class 208 which constitutes the basic body of the TFT array substrate 208A is provided with the TFT substrate 206 via a transparent adhesive laver 207 secured to the inner surface thereof. The TFT substrate 206 is formed thereon with pixel electrodes 206a and TFTs (Thin Film Transistors), not shown, for driving the pixel electrodes 206a. The pixel electrodes 206a are formed in areas which overlap with the above-described apertures 203b in plan view. The TFTs and wirings (not shown) for supplying electric signals to the TFTs are provided in the areas which overlap with the black matrix portions 203a in plan view. The alignment layer, not shown, is formed so as to cover the pixel electrodes 206a, the TFTs and the wirings.

The liquid crystal layer 205 for modulating the transmitted light rays is encapsulated between the TFT array substrate 208A and the opposed substrate 200A. Examples of employable liquid crystal modes of the liquid crystal layer 205 include TN (Twisted Nematic) mode, VAN (Vertical Aligned Nematic) mode, STN (Super Twisted Nematic) mode, ECB (Electrically Controlled Birefringence) mode, and OCB (Optical Compensated Bend) mode.

The R-light from the extra-high pressure mercury lamp 101 enters the liquid crystal panel 120R from the upper side in FIG. 3, passes through the apertures 203b, opposed electrode 204, the liquid crystal layer 205, the pixel electrodes 206a, the TFT substrate 206 in sequence, and goes out from the side of the exit-side dust proof glass 208 toward the cross-dichroic prism 112. At this time, the light amount which passes through the second polarizing plate 122R is controlled pixel-by-pixel by the R-light modulated by the liquid crystal layer 205.

In the configuration shown in FIG. 1, the first polarizing plate 121R and the second polarizing plate 122R are provided separately with respect to the liquid crystal panel 120R. However, it is also possible to provide a polarizing plate between the entrance-side dust proof glass 200 and the opposed electrode 204, or between the exit-side dust proof glass 208 and the TET substrate 206 instead.

Subsequently, FIG. 11 illustrates a configuration of the partial cross-section of the liquid crystal panel 120R. The prism elements 211 correspond to light-path deflecting members formed into a groove-shape from the side surface of the liquid crystal layer 205 of the entrance-side dust proof glass 200 toward the interior thereof, and the interior of each prism element 211 is hollow. The cross-section of the prism element 211 is a triangle shape, and has the two beveled portions 211a, 211a opposing to each other in the lateral direction of the drawing as reflection surfaces thereof. The interior of the prism element 211 having the beveled portions 211a is hollow, and hence the refractive index is almost the same as air, which is lower than the refractive index of the entrance-side dust proof glass 200. Therefore, the light rays passing through the entrance-side dust proof glass 200 may be reflected by the beveled portion 211a.

The black matrix portions 203a are provided so as to cover the opening ends of the prism elements 211. More specifically, distal ends C1 of the prism elements 211 are positioned substantially at the widthwise (in the lateral direction in the drawing) centers of the black matrix portions 203a, and the width B of the opening end (the width of the opening) of the prism element 11 of the black matrix portion 203a and the width b of the black matrix portion 203a substantially match. Therefore, the light rays entering the prism elements 211 are reflected toward the apertures 203b. Furthermore, the areas in the vicinity of the black matrix portions 203a which do not contribute to display may be used effectively.

Although the width of each of the black matrix portions 203a substantially matches each of the opening ends of the prism elements 211 in this embodiment, while the interior of each of the prism elements is hollow in this embodiment, such a structure may be achieved easily by forming the black matrix portions 203a on the entrance-side dust proof glass 200. That is, since the width W1 of the opening end of each of the prism elements 211 is on the order of several μm, when a Cr film or the like which constitutes the black matrix portions 203a is formed or the surface of the entrance-side dust proof glass 200, the Cr film is accumulated in the vicinity of the opening ends and closes the prism elements 211 without being filled in the interiors of the prism elements 211. Therefore, the structure shown in FIG. 11 may be obtained easily by patterning the Cr film by the photolithography process.

In order to prevent the black matrix portions 203a row entering the interiors of the prism elements 211 further reliably, a resin material may be provided at the opening ends of the prism elements 211 prior to the formation of the black matrix portions 203a. In this case, the resin material is preferably a material having a smaller refractive index than the entrance-side dust proof glass 200. In this configuration, the light rays proceeding in the entrance-side dust proof glass 200 may be reflected even at the portions where the resin material is provided, so that lowering of the efficiency for light utilization is prevented. When a metal film having a light-reflecting property such as Al film is used as the black matrix portions 203a, the Al film may be formed on the inner surfaces of the prism elements 211. In such a case, the light rays entering the beveled portions 211a are reflected by the surface of the Al film, and hence the light-reflecting function of the prism elements 211 is not impaired.

Figure 12:
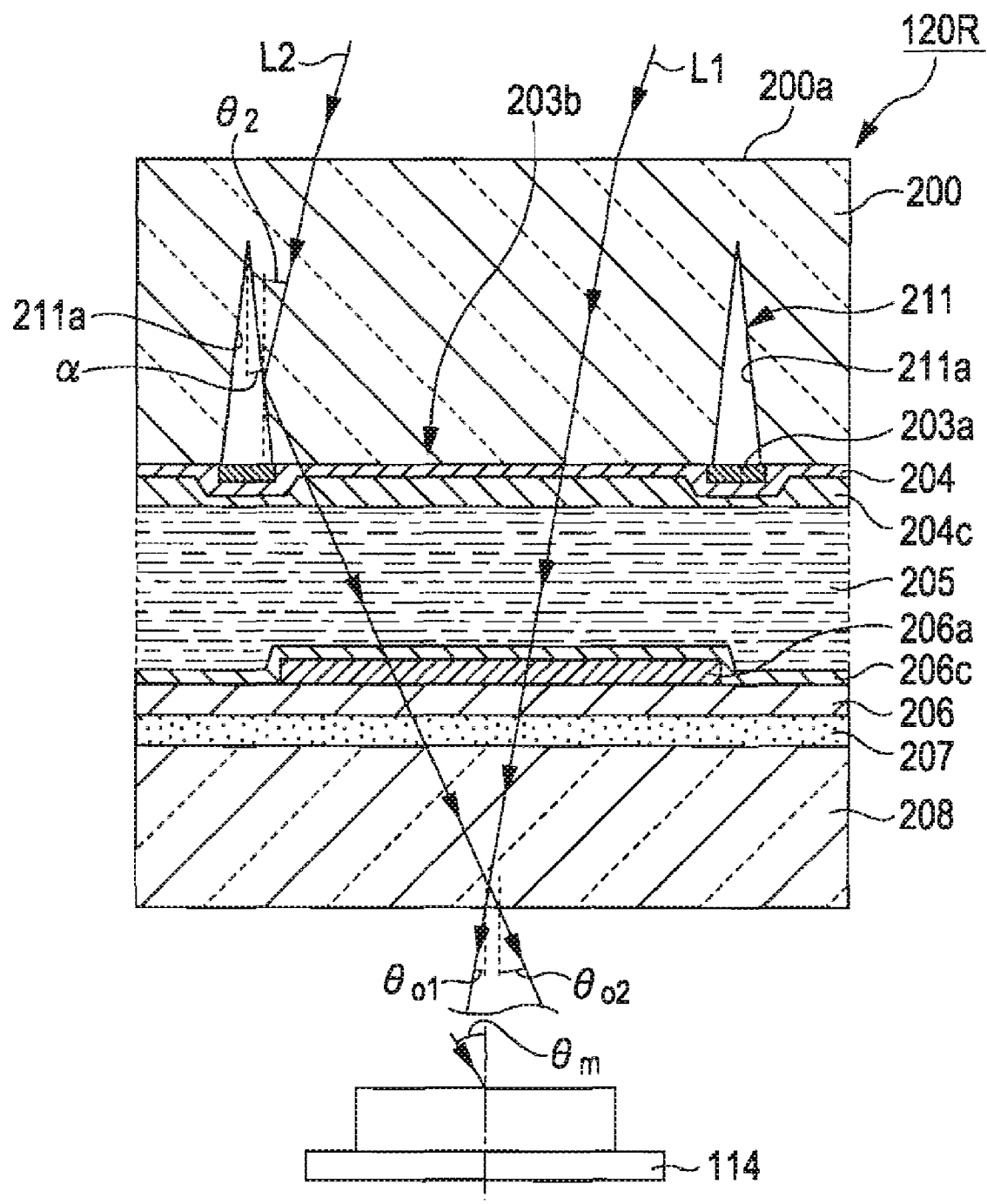
FIG. 12 is an explanatory drawing showing an operation of the prism element.

Referring now to FIG. 12, the operation of the prism elements 211 will be described. FIG. 12 illustrates the configuration of the partial cross-section of the liquid crystal panel 120R in one pixel for explaining the operation of the prism element 211. According to the optical path generally shown in FIG. 12, the light rays L1 and L2 entering the liquid crystal panel 120R proceed toward the exit-side dust proof glass 208 while being reflected or refracted on the interface having the difference in refractive index. In the description in FIG. 12, the optical path is shown so that the light rays proceed straight through the interface having a minute difference in refractive index for the simplicity of description.

The light ray L1 which enters directly into the aperture 203b without passing through the prism element 211 will be described. The light ray L1 proceeding in air enters the entrance-side dust proof glass 200 formed of, for example, a quartz glass from the entrance plane 200a. The light ray L1 enters the liquid crystal layer 205 through the entrance-side dust proof glass 200 and the opposed electrode 204 and is modulated according to the state of alignment of the liquid crystal in the liquid crystal layer 205. The light ray L1 modulated according to the image signals passes through the adhesive layer 207 and goes out from the exit-side dust proof glass 208. Since the outgoing angle θo1 of the light ray L1 is smaller than the maximum angle θm determined by the NA of the projection lens 114, the light ray L1 is protected to the screen 116, not shown, via the projection lens 114.

The light ray L2 which enters a position different from the light ray L1 will be described. The light ray L2 enters the entrance-side dust proof glass 200 through the entrance plane 200a. The light ray L2 proceeding in the entrance-side dust roof glass 200 enters the beveled portion 211a of the prism element 211. As the prism element 211 is hollow and has the refractive index smaller than the entrance-side dust proof glass 200, the light ray is reflected by the beveled portions 211a and then enters the apertures 203b. The light ray L2 entering the aperture 203b proceeds in the same manner as the light ray L1 described above, and goes out from the exit-side dust proof glass 208.

The relationship among the incident angle, the reflecting angle, and the outgoing angle of the light ray L2 will now be described.

The entrance-side dust proof glass 200 is a parallel plate having the entrance plane 200a and the exit plane which is parallel with the entrance plane 200a, The angle formed between the direction of the normal line of the entrance plane 200a and the direction of the light ray L2 is assumed to be the incident angle θ2, and the inclination angle of the beveled portion 211a with respect to the direction of the normal line of the entrance plane 200a is represented by α. The angle formed by the light ray L2 proceeding in the liquid crystal panel 120R and outgoing from the exit-side dust proof glass 208 is assumed to be the outgoing angle θo2.

The light ray L2 is refracted due to the difference in refractive index at the interface between the opposed electrode 204 and the alignment layer 204c, the interface between the alignment layer 204c and the liquid crystal layer 205, the interface between the liquid crystal laver 205 and the alignment layer 206c, and the interface between the alignment layer 206c and the pixel electrode 206a. However, for the simplicity of the description of the operation of the prism element 211, it is assumed that the light ray L2 proceeds almost straight through these interfaces. Under such an assumption, the following expression (1) is established.

$$\alpha = (1/2) \cdot (\theta o2 - \theta 2) \quad (1)$$

As is clear from the expression (1) shown above, the incident angle θ2 of the light ray L2 may be converted into the outgoing angle θo2 before going out by setting the inclination angle α of the beveled portion 211a. The light ray L2 may be caused to be projected onto the screen 116, not shown, by setting the outgoing angle θo2 of the light ray L2 to a value smaller than the maximum angle θm determined by the NA of the projection lens 114.

Figure 13:
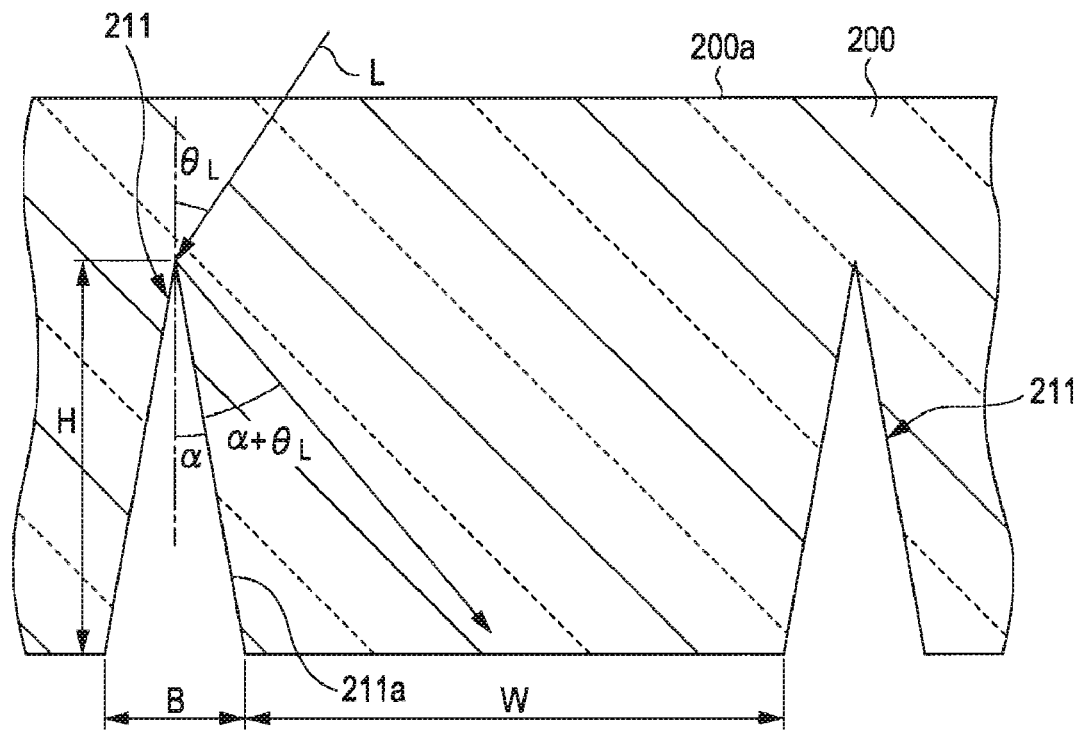
FIG. 13 is an explanatory drawing showing an operation of the prism element.

FIG. 13 is a configuration of a partial cross-sectional view of the entrance-side dust proof glass 200 including the prism elements 211 for explaining a detailed configuration of the prism elements 211. The width B, the depth H, and the incident angle θL of the incident light ray L of the prism elements 211 according to this embodiment are set to satisfy the following expression (2) with respect to the width of the aperture 203b (aperture width) W.

$$H \times \tan(2 \times a \tan(B/2H) + \theta L) - B/2 < W \quad (2)$$

In the expression (2) shown above, the maximum value of the incident angle θL is an angle determined on the basis of the light source and the optical system to the liquid crystal panel, and the aperture width W is a width determined according to the resolution of the liquid crystal panel and the design of the pixel. In the invention, the width B of the opening of the prism element 211 and the depth H of the prism element 211 which can maximize the efficiency for light utilization are determined with respect to the parameters θL and W. In other words, according to the prism element 211 formed so as to satisfy the expression (2) shown above, the direction of light rays incoming from the entrance plane 200a to the entrance-side dust proof glass 200 and reflected by the beveled portions 211a are directed to the apertures 203b, whereby bright and high-contrast display is obtained.

Further preferably, the depth H of the prism element, the width W of the aperture between the prism elements, and the width B of the opening of the prism element satisfy the following expression.

$$H > B + W$$

In this configuration, a problem such that the reflected light rays from the beveled portions are diffused a hence the efficiency for light utilization is lowered may be avoided. Therefore, it is effective for improvement of the efficiency for light utilization, and more specifically, for utilization in the projector.

In the case of the prism element 211 having a triangular cross-section shown in FIG. 13, since the beveled portions 211a have a uniform reflecting property in the depth direction, it can be applied without any change. However, when the reflecting property of the beveled portions is not uniform, It can be applied by correcting the expression (2) as needed, which will be described below on the basis of FIG. 14.

Figure 14A:
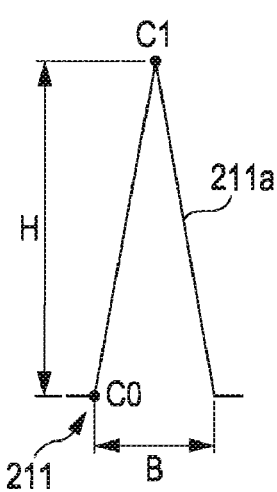
FIGS. 14A, 14B and 14C are explanatory drawings showing operations of the prism elements having other cross-sectional shapes.
Figure 14B:
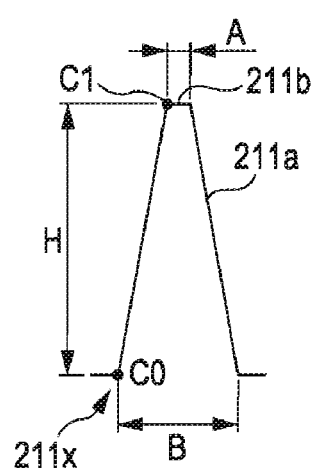
Figure 14C:
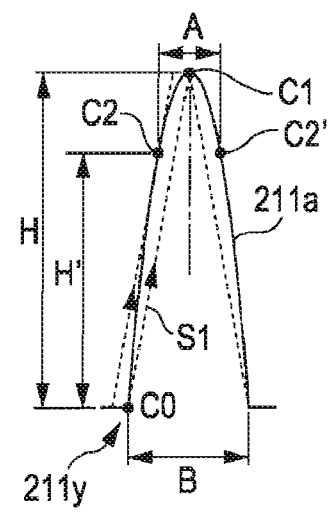

FIG. 14A to FIG. 14C illustrate configurations of the cross-section of the prism elements for explaining setting of the depth H and the width B in the case in which the cross-sectional shape of the prism elements is different. FIG. 14A illustrates a configuration of the cross-section of the prism element 211 having the same triangular cross-section as in FIG. 13, FIG. 14B is illustrates a configuration of a cross-section of a prism element 211x having a trapezoidal cross-section, and FIG. 14C illustrates a configuration of the cross-section of a prism element 211y having the curved shaped beveled portions 211a. In the case of the prism element 211 having a triangular cross-section shown in FIG. 14A, the depth H is defined by the length of the prism element from the opening end C0 to the distal end C1 in the direction of the normal line of the entrance-side dust proof glass 200 as described above.

Subsequently, in the case of the prism element 211x having the trapezoidal cross-section in FIG. 14B, the depth H is the length of the prism element from the opening end C0 to the distal end C1 in the direction of the normal line of the entrance-side dust proof glass 200 like the prism, element 211 shown in FIG. 14A. However, a flat surface 211b is formed at a position of the distal end C1 of the prism element 211x, and the light lay L entering the flat surface 211b from above in the drawing cannot be guided to the aperture 203b. Therefore, through the usage of the sum of the width B of the opening end and the width A of the flat surface shown in FIG. 14B, that is, B+A instead of the width B in the expression (2), the dimensions of the prism element 211x with respect to the light ray L at the incident angle of θL are set adequately. A corrected expression (3) of the expression (2) is shown below.

$$H \times \tan(2 \times a \tan((B-A)/2H) + \theta L) - (B-A)/2 < W \quad (3)$$

In the case of the prism element 211y having the curved shaped beveled portions 211a shown in FIG. 14C, the width B of the opening end is the same as the prism element 211 in FIG. 14A. However, in the case of the prism element 211y shown in FIG. 14C, the inclination angle of the beveled portions 211a on the distal end side (the inclination angle of the beveled portion 211a with respect to the direction of the normal line of the entrance-side dust proof glass 200) is large and the inclination angle at the position of the distal end C1 is about 90°. Therefore, the light rays entering the distal end side of the prism element 211y proceed in the prism element 211 without reflected totally by the beveled portions 211a or do not proceed toward the apertures 203b. In this case, a correction to subtract the distal end portion of the beveled portion 211a from the beveled portion is made to the expression (2), so that the expression shown above may also be applied to the prism element 211y having a cross-sectional shape shown in FIG. 14C. More specifically, through the usage of the depth H' shown in FIG. 14C instead of the depth H of the prism element 211y in the expression (2), the dimensions of the prism element 211x with respect to the light ray L at the incident angle of θL are set adequately. A corrected expression (4) of the expression (2) is shown below.

$$H' \times \tan(2 \times a \tan((B-A)/2H') + \theta L) - (B-A)/2 < W \quad (4)$$

The depth H' in the expression (4) defines a straight line S1 connecting the opening end C0 and the distal end C1 of the prism element 211y, and may be set as a depth of the prism element 211y to a contact point C2 assuming that the straight line parallel to the straight line S1 is a tangent line of the beveled portion 211a. A sign "A" in the expression (4) is defined as a distance between the C2 and C2', where C2' is a point symmetrical to the point C2 with respect to the normal line of the converging substrate passing through the distal end C1. In this manner, when the depth H' to the contact point C2 is used, the inclination angle of the beveled portion 211a from the opening end C0 to the contact point C2 not larger than the inclination angle of the straight line S1 is substantially ensured, so that the effect achieved by the design to which the expression (4) is applied is reliably obtained.

As described above, the light rays L1, L2 having various incident angles proceed to the apertures 203b, for example, from the extra-high pressure mercury lamp 101 as a light source. The light ray L1 which enters the aperture 203b without passing through the prism element 211 is modulated according to the image signals without being changed and goes out from the exit-side dust proof glass 208. In contrast, the light ray L2 entering toward the black matrix portion 203a, which is non-modulating portion around the aperture 203b, enters the prism element 211, which is light-)path deflecting member, provided around the aperture 203b. The light ray L2 entering the prism element 211 is reliably reflected toward the aperture 203b by the prism element 211 configured to satisfy the expression shown above. Accordingly, the light ray L2 which does not enter the aperture 203b in itself is efficiently guided toward the aperture 203b by having their optical path deflected by reflection.

Furthermore, the light ray L1 goes out from the liquid crystal panel 120R without having the optical path deflected. Unlike the microlens, the prism element 211 has no converging function. Therefore, the outgoing angle θo2 of the light ray L2 reflected by the beveled portion 211a of the prism element 211 is not extremely different from the incident angle θ2. Therefore, the light rays entering the liquid crystal panel 120R go out from the liquid crystal panel 120R as substantially parallel rays even after having modulated, and are projected on the screen 116 without being rejected by the projection lens 114. As described thus far, in this embodiment, increase in ray angle of the light rays L1 and L2 which go out from the first-color spatial light modulator 110R may be prevented, and in addition, the light rays L1 and L2 are guided efficiently to the apertures 203b. Therefore, the light rays going out from the liquid crystal panel 120R are projected without being rejected by the projection lens 114, and hence a bright projected image can be effectively obtained.

Although the interior of the prism element 211 does not have to be necessarily hollow, the prism element 211 preferably has a refractive index which causes the incident light ray L2 to be totally reflected toward the aperture 203b corresponding to the pixel in order to reduce the loss of the light amount by reflection. In order to cause the incident light rays to be reflected totally by the beveled portions 211a or the beveled portions 211b, it is necessary to satisfy the condition of the following expression (5). In this expression, θin represents the incident angle of the light ray with respect to the normal line of the beveled portion, n1 represents the refractive index of the entrance-side dust proof glass 200, and n2 represents the refractive index of the prism element 211, respectively. For example, in the case in which the incident angle θ2 of the light ray L2 shown in FIG. 12 is 12° (θ2=12°), the refractive index n1 for causing the total reflection is 1.46 (quartz) and the refractive index n2 for the same is 1.43.

$$\sin \theta in = n2/n1 (n1 > n2) \quad (5)$$

Manufacturing Method

Subsequently, the procedure for forming the prism elements 211 and the black matrix portions 203a on the entrance-side dust proof glass 200 in the liquid crystal panel 120R configured as described above will be described. FIGS. 15A to 15D illustrate a procedure for forming the prism elements 211, and FIGS. 16A and 16B illustrate a procedure for forming the black matrix portions 203a.

The prism elements 211 may be formed by a method using a laser application or a method using a dry etching process. The procedure shown from FIGS. 15A to 15D is a method of forming the prism elements 211 by the dry etching process using a thick film resist.

Figure 15A:
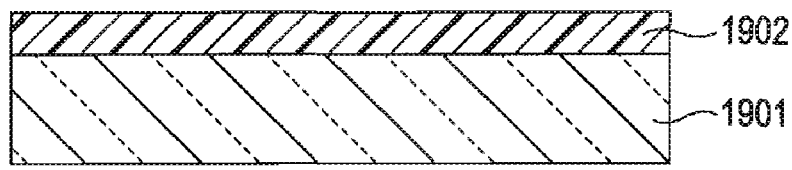
FIGS. 15A to 15D are cross-sectional process drawings for explaining a method of manufacturing the liquid crystal panel.
Figure 15B:
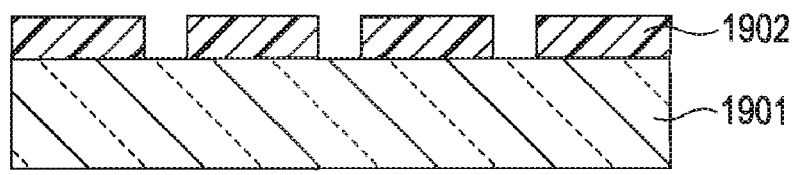
Figure 16A:
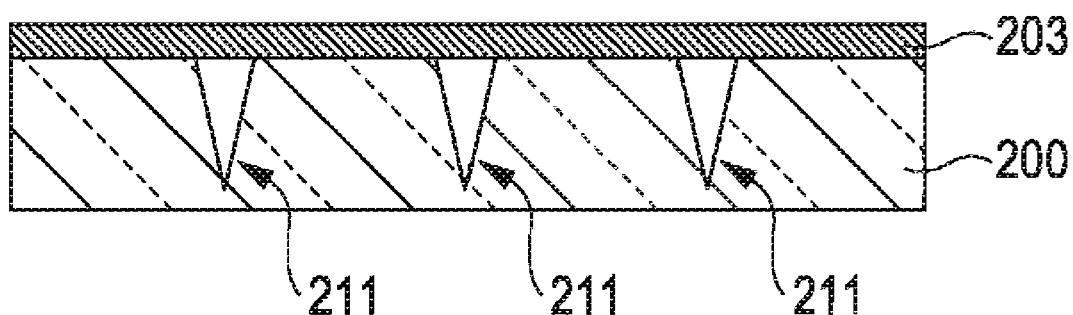
FIGS. 16A and 16B are cross-sectional process drawings for explaining a method of manufacturing the liquid crystal panel.
Figure 16B:
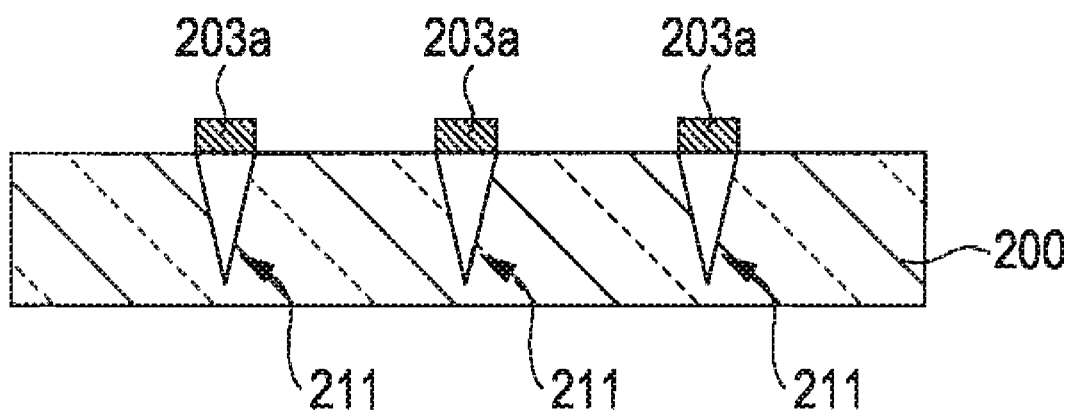

As shown in FIG. 15A, the substrate 1901 is formed with a resin resist layer 1902. The substrate 1901 may be a glass substrate or a transparent resin substrate, and the liquid crystal panel 120R in this embodiment is a dust proof glass. The resin resist layer 1902 is a mask layer, and is applied by a thickness of, for example, 50 μm to 200 μm. For example, SU-8, KMPR (both are registered trademark of Micro Chem Corp) may be used as the resin resist layer 1902. Subsequently, as shown in FIG. 15B, exposure and development processes are performed to remove portions of the resin resist layer 1902 where the prism elements 211 are to be formed. Then, it is baked for about 60 minutes at a temperature of approximately 100° C.

Figure 15C:
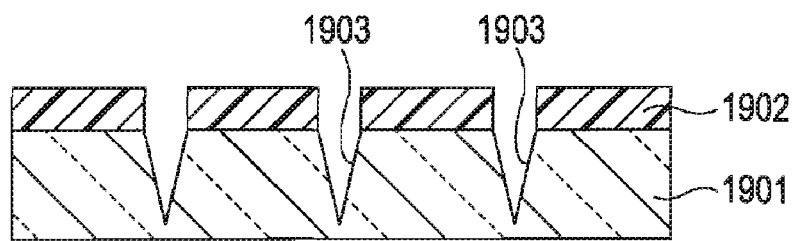

Subsequently, the dry etching process is performed using the patterned resin resist layer 1902 as a mask. The dry etching is performed using, for example, an ICP dry etching device which is able to form high-density plasmas. Grooves 1903 of a rocket shape in cross-section are formed in the substrate 1901 by the dry etching process as shown in FIG. 15C. Preferably, fluoride based gas such as $C_4F_8$ or $CHF_3$ is used as etching gas which is capable of forming the high-density plasmas uniformly in the etching area.

In the above-described dry etching process, the grooves 1903 having a depth about, four times the thickness of the resin resist layer 1902 may be formed in the substrate 1901 by setting the etching selectivity between the material of the substrate 1901 and the material of the resin resist layer 1902 to, for example, four part to one. The inclination angle of the side wall portions (the beveled portions which constitute the prism element 211) of the grooves 1903 may be controlled by controlling the composition of the etching gas, or the substrate temperature or the pressure at the time of etching. In the etching process, carbonization of the resist due to the etching environment may be prevented by cooling the substrate 1901 by a chiller, or providing cooling time between the etching cycles. The dry etching process using SU-8 is described in, for example, Takayuki Fukasawa et al, "Deep Dry Etching of Quartz Plate Over 100 μm in Depth Employing Ultra-Thick Photoresist (SU-8)" (Japanese Journal of Applied Physics. Vol. 42 (2003) pp 3702-3706, The Japan Society of Applied Physics). After having formed the grooves 1903, the resin resist layer 1902 remaining on the substrate 1901 is removed.

Figure 15D:
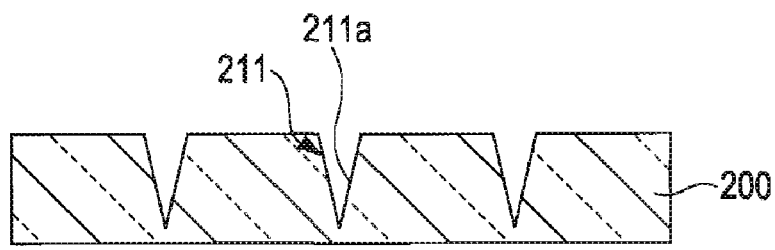

Through sealing of air or other transparent materials in the grooves 1903 formed in this mariner, as shown in FIG. 15(d), the prism element 211 having the triangular cross-section having the opposed beveled portions 211a is formed. When sealing air in the prism elements 211, it is preferable to depressurize the interiors of the prism elements 211. By depressurizing the interiors of the prism elements 211, thermal expansion of air in the prism elements 211 due to temperature increase is alleviated, so that the parts in the vicinity of the prism elements 211 are prevented from coming off.

Referring now to FIGS. 16A and 16B, a process of forming the black matrix portions 203a on the entrance-side dust proof glass 200 formed with the prism elements 211 will be described.

As shown in FIG. 16A, for example, a light-shielding film 203 formed of metal material such as Cr or Al, or black resin is formed on the entrance-side dust proof glass 200 formed with the prism elements 2111. Known film forming methods such as the spattering method or the CVD method may be used as a method of forming the light-shielding film 203, and the film thickness of the light-shielding film 203 is, for example, about 1 μm. At this time, since the opening ends of the prism elements 211 having a width of several pin are closed by the light-shielding film 203, the light-shielding film 203 is not formed inside the prism elements 211.

Subsequently, by patterning the light-shielding film 203 using the photolithography method, the black matrix portions 203a are formed so as to cover the pattern of the prism elements 211 in plan view as shown in FIG. 16B. Subsequently, the opposed substrate 200A is manufactured by forming the opposed electrode 204 and the alignment layer 204c. Then, it is bonded with a separately manufactured TFT array substrate 208A and the liquid crystal layer 205 is sealed between the substrates, so that the liquid crystal panel 120R is manufactured.

Figure 17:
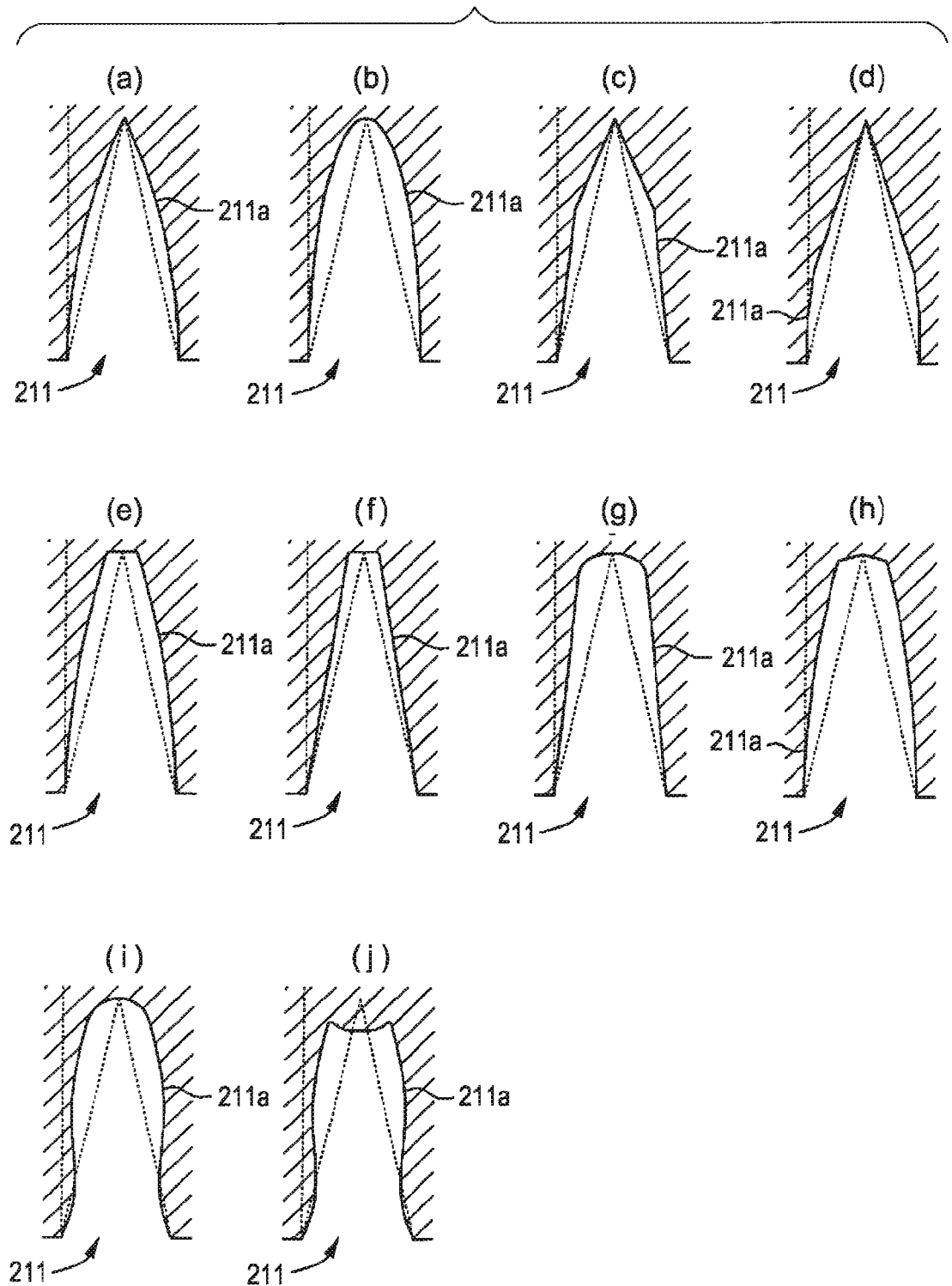
FIG. 17 illustrates partial cross-sections showing examples of other configurations of the prism element.
Figure 18:
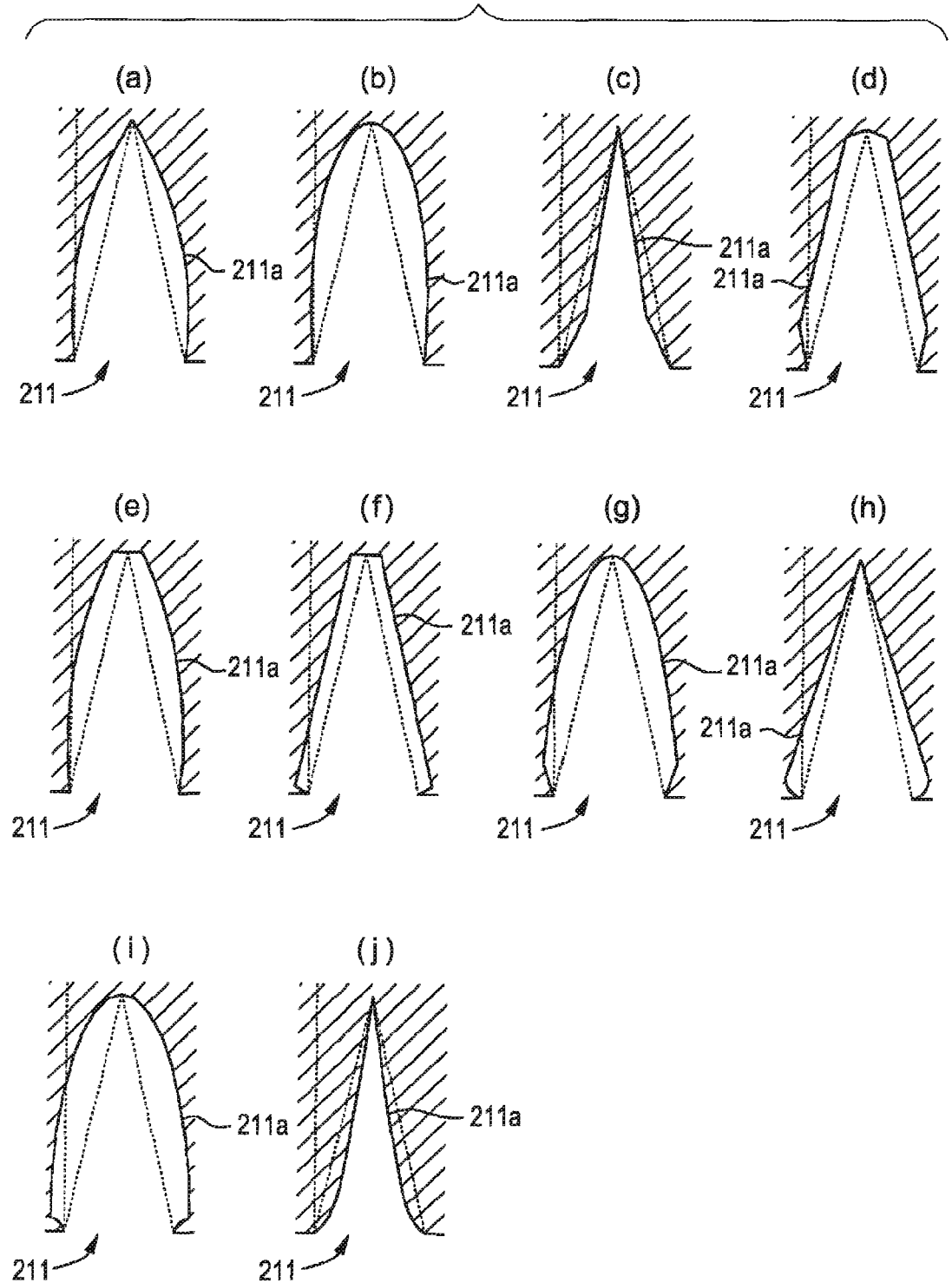
FIG. 18 illustrates partial cross-sections showing examples of other configurations of the prism element.

Although the case in which the prism elements 211 have a triangle shape in cross-section has been described in the embodiment shown above, the technical scope of the invention is not limited to the above-described embodiment. For example, as regards the prism elements 211 having cross-sectional shapes as shown in FIGS. 17A to 17J and FIGS. 18A to 18J, advantages of the electro-optic device in the invention are achieved. Therefore, when the liquid crystal panel is configured using the substrate having the prism elements 211 shown in FIG. 17 and FIG. 18, the light rays are efficiently guided to the apertures of the pixels, and hence the liquid crystal panel which achieves bright and high-contrast display is obtained.

Electronic Apparatus

Subsequently, an electronic apparatus according to an aspect of the invention will be described.

Figure 19A:
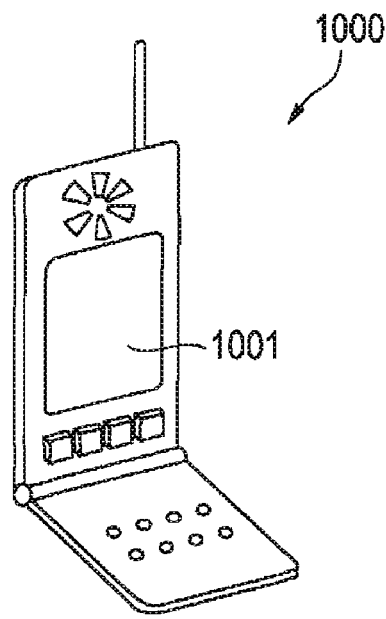
FIG. 19A Illustrates perspective configuration of an example of electronic apparatus.
Figure 19B:
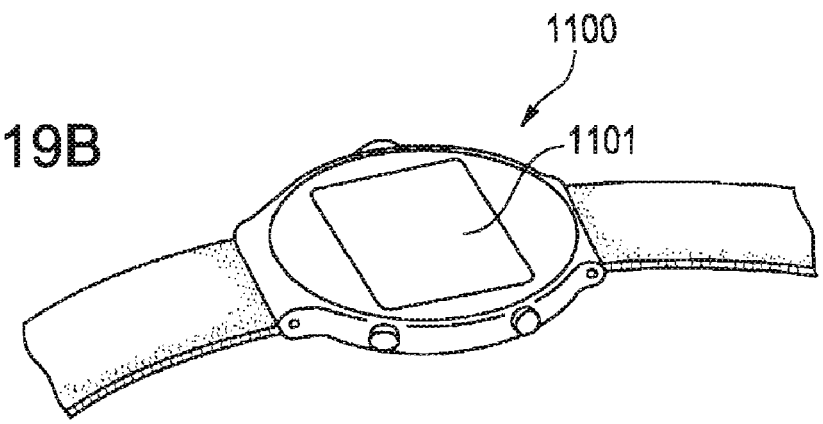
FIG. 19B is illustrates perspective configuration of an example of electronic apparatus.
Figure 19C:
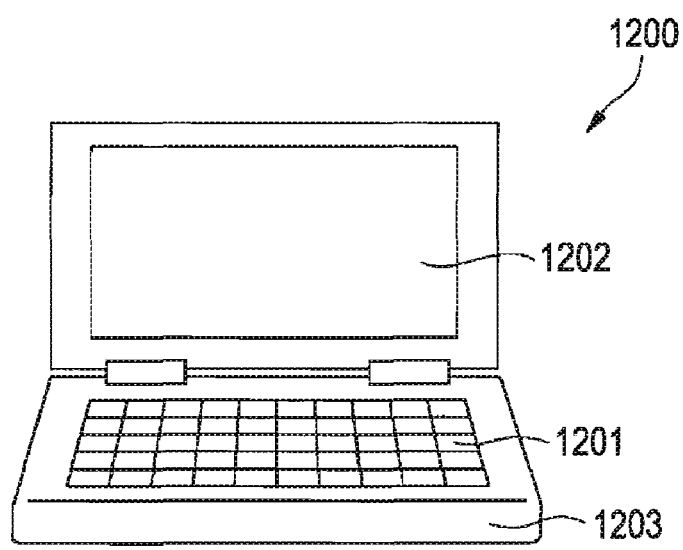
FIG. 19C is perspective configuration of an example of electronic apparatus.

The electronic apparatus has the electro-optic device according to an aspect of the invention as a display unit, and more specifically, an apparatus shown in FIGS. 19A to 19C are exemplified.

FIG. 19A is a perspective view showing an example of a mobile phone. In FIG. 19A, the mobile phone 1000 includes a display unit 1001 employing the electro-optic device according to an aspect of the invention.

FIG. 19B is a perspective view showing an example of a watch type electronic apparatus. In FIG. 19B, the watch 1100 includes a display unit 1101 employing the electro-optic device according to an aspect of the invention.

FIG. 19C is a perspective view showing an example of an information procession device such as a word processor or a personal computer. In FIG. 19C, the information processing device 1200 includes an input unit 1201 such as a keyboard, a display unit 1202 using the electro-optic device according to an aspect of the invention, and an information processing device body (casing) 1203.

Since the respective electronic apparatus shown in FIGS. 19A to 19C are provided with the display units 1001, 1101, 1202 each having the electro-optic device according to an aspect of the invention, high-contrast display is achieved, and the superior reliability is realized.

What is claimed is:

1. An electro-optic device having a plurality of pixels arranged in a matrix pattern, comprising:
    a converging substrate formed of a transparent substrate having groove-shaped prism elements formed in an array pattern,
    the prism elements being arranged along boundary areas of the pixels,
    the prism elements each including first beveled portion and a second beveled portion arranged on side walls thereof in the direction of the thickness of the converging substrate, the first beveled portion being arranged on an opening end side of each of the prism elements with respect to the normal line of the surface of the converging substrate on which the prism elements are formed, the second beveled portion being inclined with respect to the normal line by a predetermined angle, and
    the inclination angle of the first beveled portion being smaller than the inclination angle of the second beveled portion.

2. The electro-optic device according to claim 1, wherein the first beveled portion arranged on the opening end side of each of the prism elements is formed so as to extend in parallel with the normal line of the converging substrate.

3. The electro-optic device according to claim 1, light-shielding members being provided on a surface of the converging substrate at positions to cover the opening ends of the prism elements.

4. The electro-optic device according to claim 1, a resin layer being formed on the opening ends side of the prism elements.

5. A substrate for an electro-optic device which is applicable as converging member for pixels of the electro-optic device, comprising:
- a converging substrate formed of a transparent substrate having groove-shaped prism elements formed in an array pattern,
- the prism elements being arranged along boundary areas of the pixels,
- the prism elements each including a first beveled portion and a second beveled portion arranged in the direction of the thickness of the converging substrate, the first beveled portion being arranged on an opening end side of each of the prism elements with respect to the normal line of the surface of the converging substrate on which the prism elements are formed, the second beveled portion being inclined with respect to the normal line by a predetermined angle, and
- the inclination angle of the first beveled portion being smaller than the inclination angle of the second beveled portion with respect to the normal line.

6. The substrate for an electro-optic device according to claim 5, the depth H of the prism element, the width W of an aperture between the prism elements, and the width B of an opening of the prism element satisfying the following expression:

$$H > B + W.$$

7. A converging substrate comprising:
- a first main surface on which a plurality of prism elements are formed, and
- a second main surface opposing the first main surface,
- wherein the plurality of prism elements each are formed into a groove shape,
- wherein side walls of the plurality of prism elements each include a first portion and a second portion, and
- wherein a first angle between the normal line of a flat portion of the first main surface on which the plurality of prism elements are not formed with respect to the first portion is different from a second angle between the second portion and the normal line.

8. The converging substrate according to claim 7, wherein the first portion from among the first portion and the second portion may be located closer to the flat portion than the second portion.

9. The converging substrate according to claim 8, wherein the first angle may be smaller than the second angle.

10. An electro-optic device comprising:
- the converging substrate according to claim 7, and
- an electro-optic panel having a plurality of pixel electrodes,
- the plurality of prism elements each being provided so as to overlap with areas between the two adjacent pixel electrodes from among the plurality of pixel electrodes.

11. A projector comprising the electro-optic device according to claim 1.

12. An electronic apparatus comprising the electro-optic device according to claim 1.

* * * * *